US012199934B2

(12) United States Patent
Singh et al.

(10) Patent No.: US 12,199,934 B2
(45) Date of Patent: Jan. 14, 2025

(54) GENERATING AND SURFACING MESSAGING THREAD SPECIFIC AND CONTENT-BASED EFFECTS

(71) Applicant: Meta Platforms, Inc., Menlo Park, CA (US)

(72) Inventors: Manik Singh, Oakland, CA (US); Louis Benoit Philippe Boval, San Francisco, CA (US); Alice Chuang LeBeau, New York, NY (US); Seyit Yilmaz, Menlo Park, CA (US); Ivan Fernando Soriano Osornio, Oakland, CA (US); Sateesh Kumar Srinivasan, Redwood City, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 80 days.

(21) Appl. No.: 17/663,591

(22) Filed: May 16, 2022

(65) Prior Publication Data

US 2023/0370408 A1 Nov. 16, 2023

(51) Int. Cl.
*H04L 51/216* (2022.01)
*H04L 51/10* (2022.01)

(52) U.S. Cl.
CPC ............ *H04L 51/216* (2022.05); *H04L 51/10* (2013.01)

(58) Field of Classification Search
CPC ....... H04L 51/216; H04L 51/10; H04L 51/04; G06F 9/546; G06F 9/451
See application file for complete search history.

(56) References Cited

U.S. PATENT DOCUMENTS

| | | | | |
|---|---|---|---|---|
| 10,805,249 B1* | 10/2020 | Dalonzo | ................. | H04L 51/10 |
| 11,108,721 B1* | 8/2021 | Roberts | ................... | H04L 51/10 |
| 2006/0041848 A1* | 2/2006 | Lira | ..................... | G06Q 10/107 |
| | | | | 715/805 |
| 2018/0054405 A1* | 2/2018 | Ritch | ....................... | G06F 16/48 |
| 2020/0034033 A1* | 1/2020 | Chaudhri | .............. | G06F 3/0412 |

OTHER PUBLICATIONS

Osxdaily, "What Words Trigger iMessage Effects? List if iMessage Screen Effect Keywords for iPhone & iPad," Sep. 21, 2020, [Retrieved on May 31, 2022], 10 pages, Retrieved from Internet: https://osxdaily.com/2020/09/21/imessage-screen-effects-keyword-triggers/.

\* cited by examiner

*Primary Examiner* — Tan H Tran
(74) *Attorney, Agent, or Firm* — Mannava & Kang, P.C.

(57) ABSTRACT

The present disclosure relates to systems, non-transitory computer-readable media, and methods for generating an association between a graphic element and text for a messaging thread and providing an overlay including the graphic element based on providing a message to the messaging thread including the text. In particular, in one or more embodiments, the disclosed systems receive user selection of the text and the graphic element and provide the association between the text and the element to various client devices associated with the messaging thread. Accordingly, the disclosed systems provide instructions for each client device associated with the messaging thread to generate and provide an overlay for the messaging thread.

18 Claims, 14 Drawing Sheets

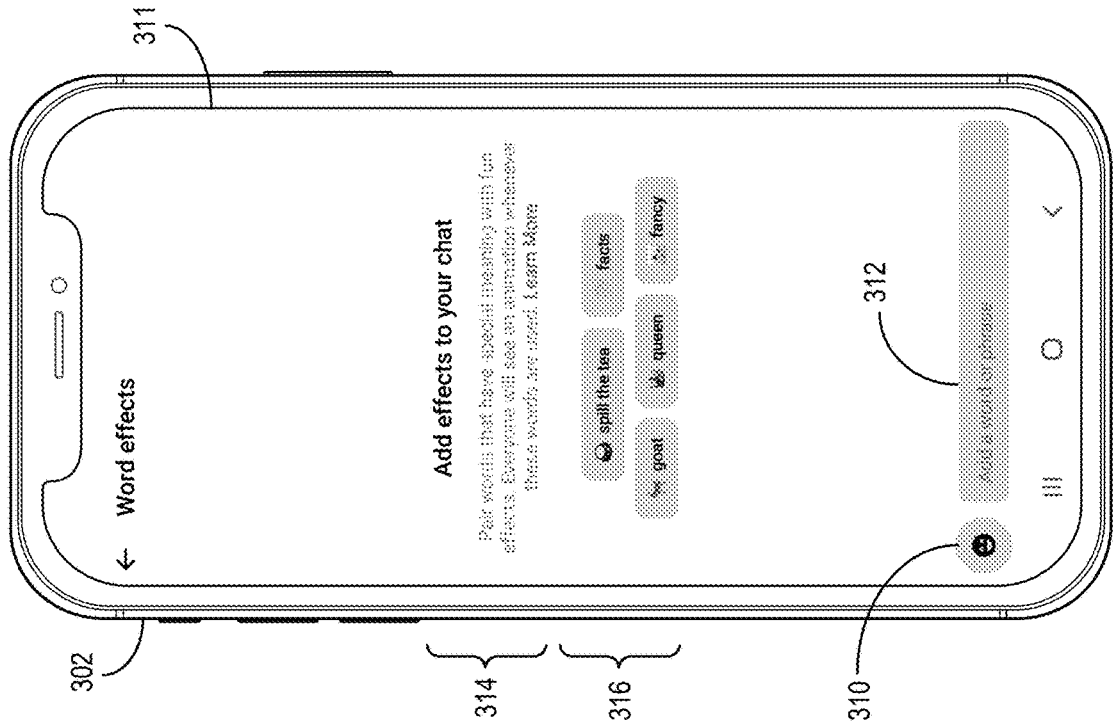
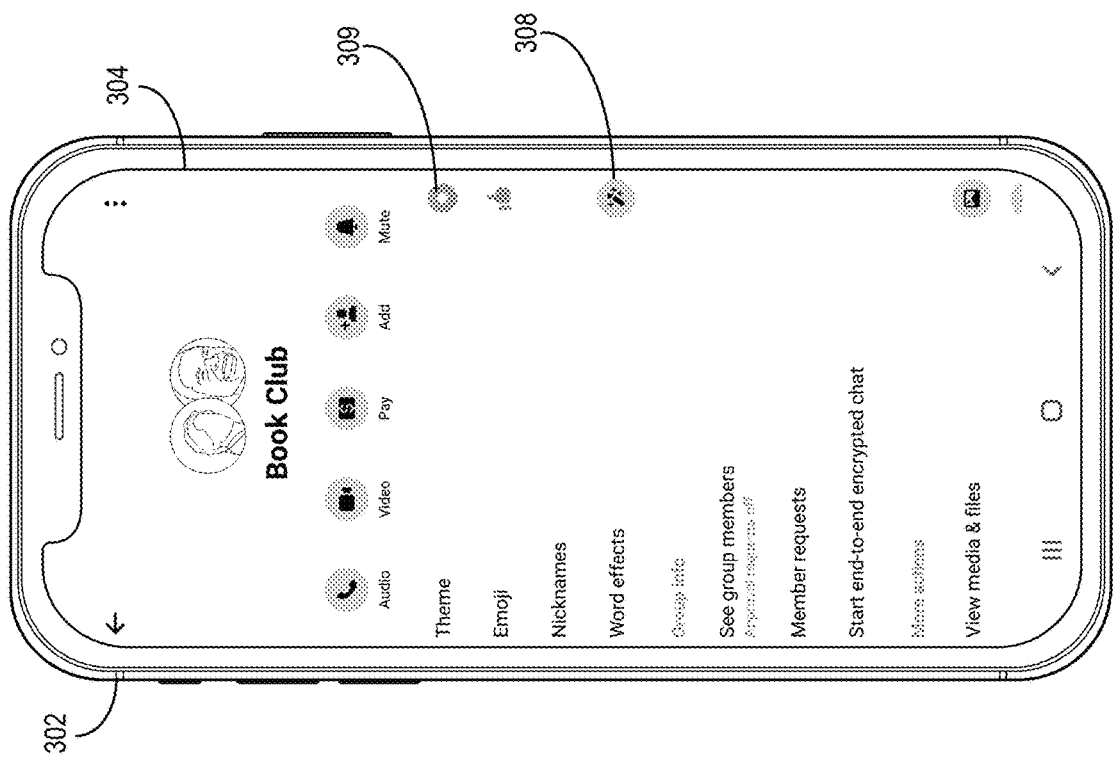
Fig. 3A
Fig. 3B

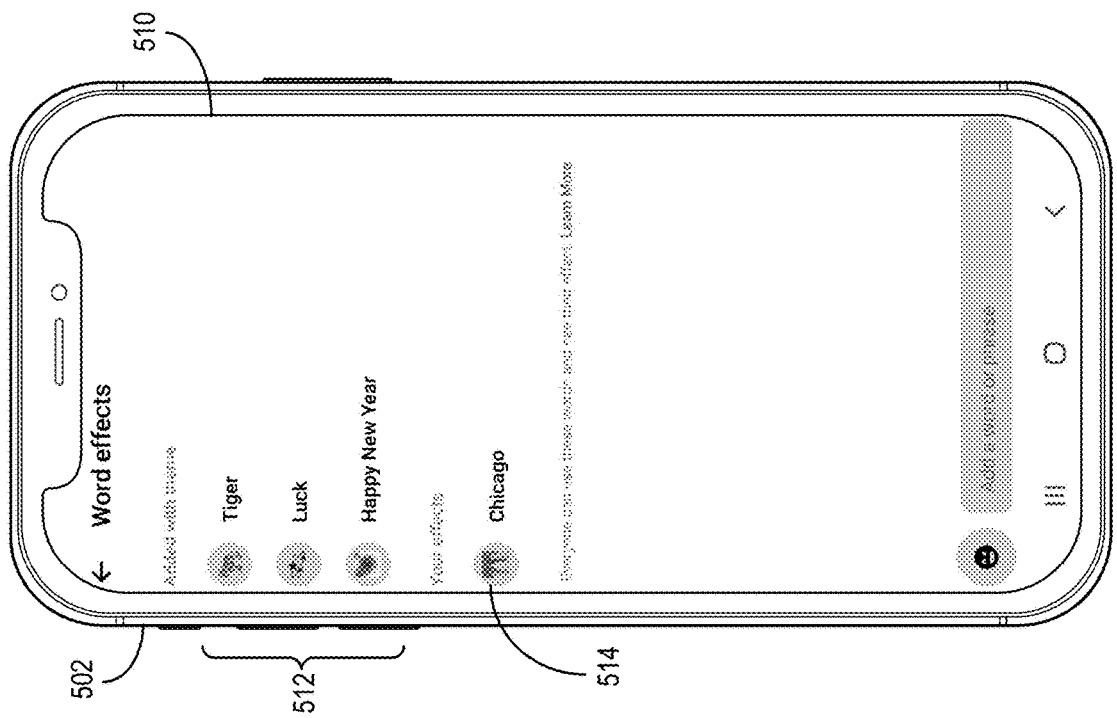
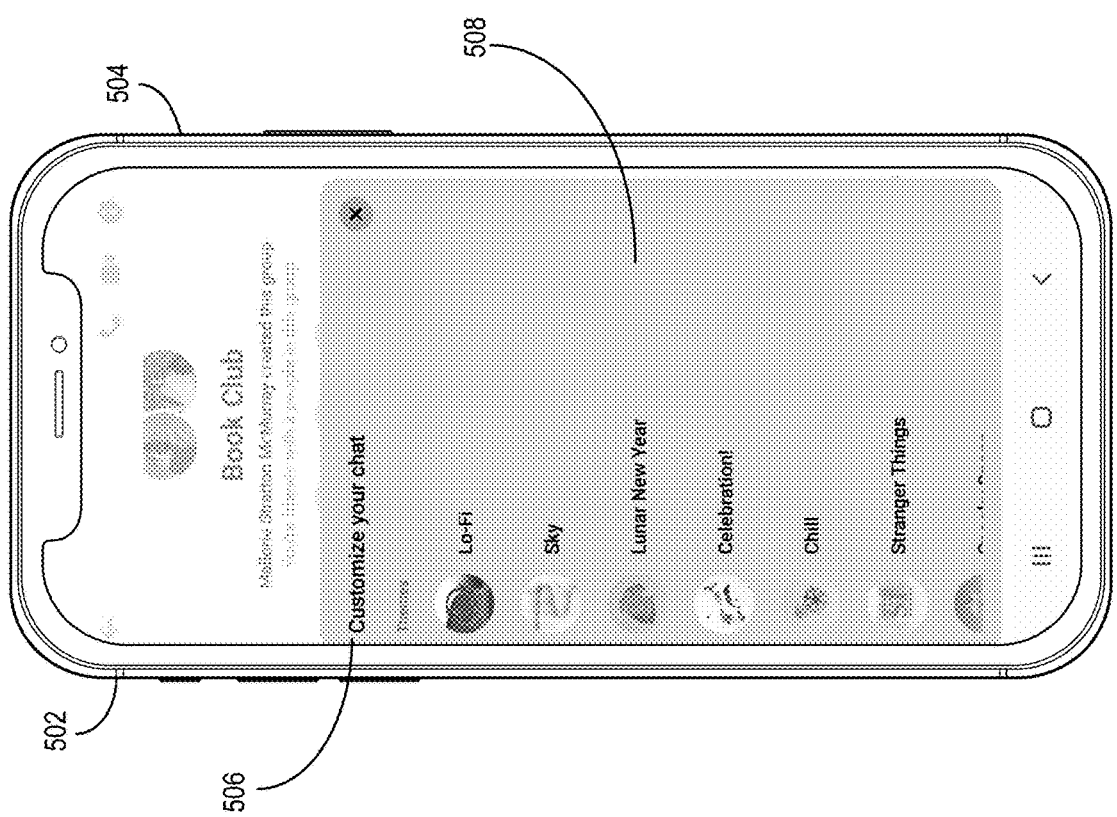
Fig. 5B
Fig. 5A

GENERATING AND SURFACING MESSAGING THREAD SPECIFIC AND CONTENT-BASED EFFECTS

BACKGROUND

Recent years have seen significant development in systems that provide ways for people to connect and communicate with one another. For example, a variety of electronic communication systems provide various methods to send and receive electronic messages. For instance, a computing device can allow a user to communicate with other users using text messaging, instant messaging, social network posts, and other forms of electronic communication. In addition, an electronic communication may include a variety of content, including, text, images, video, and/or other data. In general, electronic communication has become one of the most popular ways in which people connect and communicate with one another.

Due to the wide variety of ways in which people can communicate using electronic communication systems, as well as the convenience and mobility of electronic communication, users are often faced with receiving and sending a large number of electronic messages on a daily basis. Many conventional electronic communication systems allow a user to include a symbol (e.g., an emoticon) within an electronic message as a shortcut form of communication. Additionally, some conventional electronic communication systems allow a user to include an animation (e.g., a GIF) as a shortcut form of communication. A symbol or animation can represent a shortcut form of communication because less user input (e.g., less typing) may be required to include a symbol in an electronic communication compared to communicating the same message using conventional text.

Although using symbols can increase the efficiency of sending and receiving electronic messages, several disadvantages exist with respect to the conventional use of symbols and animations within electronic communications. For example, users often desire more granularity in the message, sentiment, or thought expressed by conventional symbols or animations. Most conventional symbols, however, are purposefully designed to represent a single message, sentiment, or thought. Thus, when a symbol does not exactly match a user's intended message, the user is forced to either take extra time to enter several words or sentences, or send a symbol that inadequately expresses the user's intended message.

To address the lack of message granularity of conventional symbols and animations, some conventional electronic communications systems include a library that includes a large number of symbols in an attempt to provide the user with a symbol that more closely matches the user's intended message. The symbol libraries, however, can cause the user to scroll or search through a large number of symbols to locate the most appropriate symbol. Unfortunately, the excessive user interactions and time that it takes the user to locate the symbol in the symbol library is often greater than the amount of user interactions and/or amount of time it would have taken for the user to simply type the message in the first place.

Further, many conventional electronic communication systems require computing resources in managing digital animations. This inefficiency of conventional electronic communication systems is compounded by the lack of granularity in the message, sentiment, or thought expressed by conventional animations. To illustrate, the large volume of conventional animations often requires conventional electronic communication systems to store and transmit an extremely large number of animations, further compounding the excessive use of computing time and resources.

Accordingly, there are a number of considerations to be made in improving electronic communications.

BRIEF SUMMARY

Embodiments of the present disclosure provide benefits and/or solve one or more of the foregoing or other problems in the art with systems, non-transitory computer-readable media, and methods for associating text with a graphic element for a messaging thread and providing an overlay for the messaging thread including the graphic element based on detecting a message added to the messaging thread including the text. More specifically, in one or more embodiments, the disclosed systems receive user selection of the text and the graphic element and generate an association between the text and the graphic element for the messaging thread. Further, in some embodiments, the disclosed systems provide the association to client devices associated with the messaging thread. Accordingly, in one or more embodiments, the disclosed systems cause client devices associated with the messaging thread to provide an overlay over the messaging thread including the graphic element in response to detecting the text in the messaging thread.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 3A-3E illustrate example graphical user interfaces for use in associating graphic elements with content and a messaging thread in accordance with one or more embodiments.

FIGS. 5A-5B illustrate example messaging thread graphical user interfaces for associating a theme with one or more predetermined content and graphical element associations with a messaging thread in accordance with one or more embodiments.

DETAILED DESCRIPTION

Figure 1:
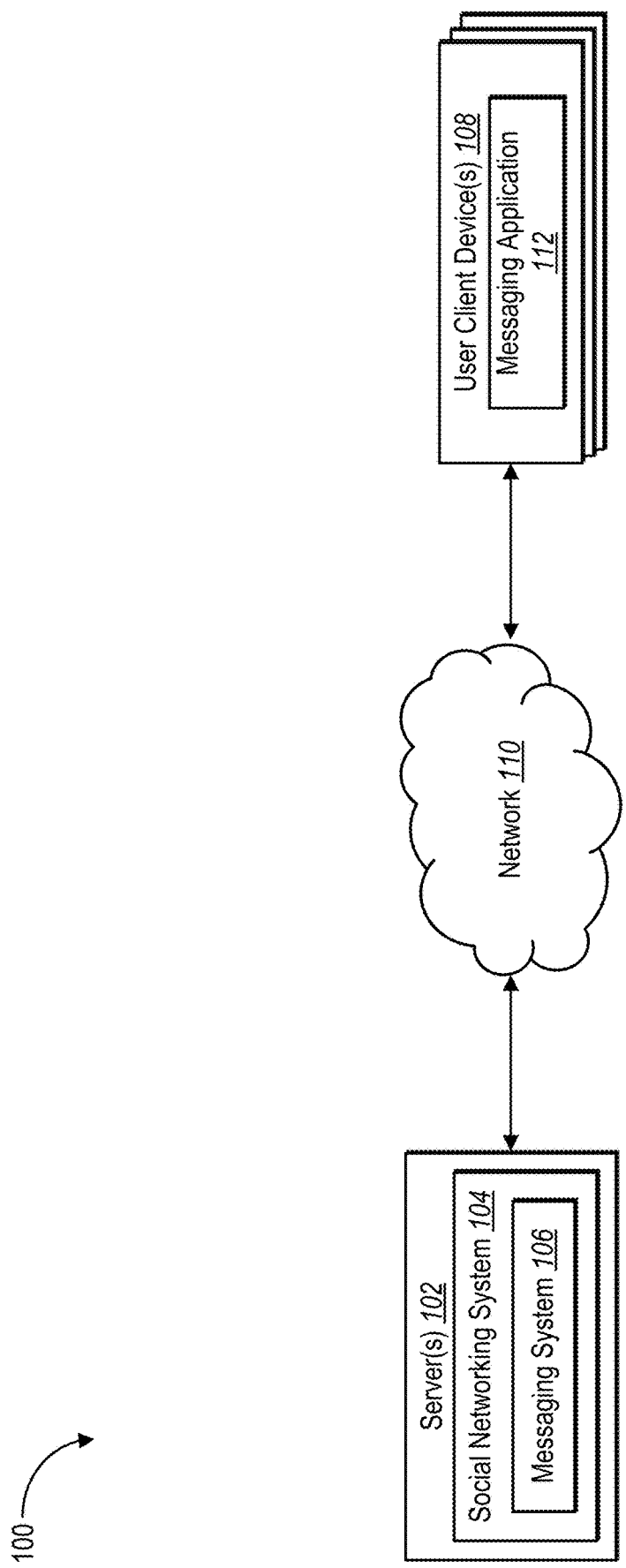
FIG. 1 illustrates a diagram of an environment in which a messaging system can operate in accordance with one or more embodiments.

This disclosure describes one or more embodiments of a messaging system that generates and provides graphical effects in real-time in messaging threads based on associations between graphic elements and content. More specifically, in one or more embodiments, the messaging system receives user selections establishing associations between graphic elements and content for particular messaging threads. In some embodiments, the messaging system provides instructions to each computing device associated with a messaging thread to generate a graphical effect including the graphic element. In one or more embodiments, the messaging system facilitates client devices providing a graphical effect including the graphic element based on detecting a message added to a messaging thread that includes the content corresponding to the graphic element for the messaging thread.

In one or more embodiments, the messaging system receives user selections of graphic elements for association with content (e.g., text) via a graphical user interface associated with a messaging thread. To illustrate, in one or more embodiments, the messaging system generates and provides suggested associations between graphic elements and content for user selection. In addition, or in the alternative, the messaging system receives custom associations between graphic elements and content. For example, the messaging system can receive user input typing text to associate with a graphic element selected or queried from a menu.

Further, in one or more embodiments, the messaging system generates an association between the text and the graphic element for the messaging thread. To illustrate, the messaging system 106 stores and manages associations for various messaging threads. Further, the messaging system can store and manage associations for different messaging threads independently from one another.

Additionally, or in the alternative, in some embodiments, the messaging system receives user input selecting a messaging theme including one or more predetermined associations between content and graphic elements. In applying the messaging theme, the messaging system can apply one or more visual or audio changes to one or more graphical user interfaces associated with the messaging thread. Further, in one or more embodiments, based on the user selection of the messaging theme, the messaging system generates the associations for the messaging thread that are included in the messaging theme.

In some embodiments, the messaging system also manages, generates, and provides messages to messaging threads based on user input from various client devices associated with the messaging threads. In one or more embodiments, the messaging system monitors messaging threads for content associated with graphic elements. Accordingly, in some embodiments, the messaging system detects messages added to messaging threads that includes content associated with graphic elements.

Further, in one or more embodiments, in response to detecting a message including content associated with a graphic element, the messaging system provides a graphical effect in the messaging thread including the graphic element. To illustrate, in some embodiments, the messaging system provides instructions to each client device associated with a messaging thread for generating the graphical effect. Also, in one or more embodiments, the client devices generate graphical effects including multiple instances of the graphic element. Further, in some embodiments, the client devices generate temporary graphical effects and apply the temporary graphical effects over a graphical user interface for a predetermined duration.

Additionally, in some embodiments, the client devices generate graphical effects including motion of various instances of the graphic element. For instance, in some embodiments, the messaging system can provide instructions to the client devices for generating animation paths for the graphic elements. In addition, or in the alternative, in one or more embodiments, the client devices generate graphical effects including animations of the graphic elements. To illustrate, in some embodiments, the messaging system provides instructions to the client devices for generating one or more animation frames that show various changes to and/or motion of the graphic elements over time.

As illustrated by the foregoing discussion, the present disclosure utilizes a variety of terms to describe features and advantages of the messaging system. Additional detail is now provided regarding the meaning of such terms. For example, as used herein, the term "messaging thread" refers to a set of digital communications exchanged between accounts of a network application (e.g., client devices with messaging application signed into the accounts of the networking application). In particular, a messaging thread can include a viewable exchange of digital communications within a user interface. An example of a messaging thread may include one or more of instant messages, digital media items, graphic elements, etc. exchanged between accounts of the networking application.

Additionally, as used herein, the term "content" refers to one or more elements added to a messaging thread. In particular, the term "content" can include text such as words or phrases (a combination of one or more words) selected for association with a graphic element. In one or more embodiments, the messaging system can associate text with graphic elements with or without a prescribed order. To illustrate, text can include "Chicago, "love," one or more of "happy" or "smile," "I miss you," and a variety of other combinations of various words.

Further, as used herein, the term "graphic element" refers to digital visual media. In particular, the term "graphic element" can include a piece of digital visual media associated with text for a messaging thread. To illustrate, a graphic element can include emoticons, GIFs, photos, drawings, and other visual media.

Also, as used herein, the term "message" refers to a digital communication. In particular, the term "message" can include a digital communication (e.g., an instant message or SMS message) delivered via a messaging thread. A message can include digital communications that contain a variety of digital content, such as digital text, digital images, or digital videos (or a combination thereof). Thus, a message can include digital text associated with one or more graphical elements for a messaging thread.

Additionally, as used herein, the term "graphical effect" refers to an effect including a graphical element. For example, a graphical effect can include providing a graphical element as an overlay. The term "overlay" refers to a piece of visual media provided over messaging thread in a graphical user interface. In particular, the term "overlay" can include a piece of visual media provided in a messaging thread graphical user interface. To illustrate, an overlay can include motion of one or more graphical elements, an animation including one or more graphical elements, and/or a variety of visual media provided over a graphical user interface or as part of a graphical user interface.

Further, as used herein, the term "animation" refers to a sequence of visual frames that create an illusion of movement when shown in sequence. In particular, the term "animation" can include a sequence of video frames that show motion of and/or changes to one or more graphic elements. To illustrate, an animation can include motion of graphic elements, changes to size of graphic elements, changes to position or shape of graphic elements, and other changes to graphic elements.

As also used herein, the term "messaging theme" refers to a set of associated changes for a messaging thread. In particular, the term "messaging theme" can include a set of tactile, visual, and audio changes that a messaging system can apply to a messaging thread. For example, a messaging theme can include designated haptic feedback, vibrations, color schemes, background images, music, notification sounds, and/or one or more associations between text and graphic elements.

The messaging system provides many advantages and benefits over conventional electronic communication systems and methods. For example, the messaging system improves accuracy in communicating a user's intended message by providing overlays including graphic elements as additional expressions of intent. To illustrate, a user can efficiently generate an association between text and a graphic element so that an overlay including the graphic element is provided to a messaging thread each time the text appears in a message for the messaging thread. This provides more accurate expression of user intent and improves the scale and range of communication possible utilizing graphic elements.

Additionally, by providing graphic elements based on associations between text and graphic elements, the messaging system improves efficiency and accuracy relative to conventional electronic communication systems. Specifically, rather than requiring users to repeatedly search for graphic elements related to their intent each time, the messaging system can provide an overlay to a messaging repeatedly and in response to messages from various computing devices based on prior user input generating the association. This reduces or eliminates excessive user interactions required by conventional systems to utilize graphic elements. Further, the messaging system provides text searching for emoticons during generation of the association, increasing efficiency by reducing user interactions required to generate the association.

Further, the messaging system improves efficiency and flexibility by providing instructions to generate graphical effects to each client device associated with a messaging thread. To illustrate, the messaging system conserves excess computing time and resources utilized by conventional systems in storing and managing digital animations by utilizing client devices to generate and provide overlays for messaging threads. Thus, the messaging system can provide a wide variety of customizable overlays including various motions and/or animations to messaging threads quickly and without undue use of computing resources.

Additional detail will now be provided in relation to illustrative figures portraying example embodiments and implementations of the digital communications system. For example, FIG. 1 illustrates a computing system environment (or "system") 100 for implementing a digital communications system in accordance with one or more embodiments. As shown in FIG. 1, the system 100 includes server(s) 102 including a social networking system 104 and a messaging system 106, user client device(s) 108, and a network 110. Each of the components of the system 100 can communicate via the network 110, and the network 110 may be any suitable network over which computing devices can communicate. Example networks are discussed in more detail below in relation to FIG. 10.

As shown in FIG. 1, the system 100 includes the server(s) 102. In one or more embodiments, the server(s) 102 may implement the messaging system 106 as part of a social networking system 104. The server(s) 102 may execute, generate, store, receive, and transmit electronic data, such as executable instructions for generating and/or providing overlays for messaging threads. Additionally, the server(s) 102 can facilitate the exchange of messages via messaging threads. In one or more embodiments, the server(s) 102 maintain data corresponding to various user accounts. In some embodiments, the server(s) 102 comprises a distributed server where the server(s) 102 includes a number of server devices distributed across the network 110 and located in different physical locations. The server(s) 102 can comprise a content server, an application server, a communication server, a web-hosting server, and/or a machine learning server.

As also shown in FIG. 1, the system 100 includes the user client device(s) 108. The system 100 can include any number of the user client device(s) 108. The user client device(s) 108 can each be one of a variety of computing devices, including a smartphone, tablet, smart watch, smart television, desktop computer, laptop computer, virtual reality device, augmented reality device, or other computing device as described in relation to FIG. 9. The user client device(s) 108 can each implement a messaging application 112 supported by the messaging system 106. Furthermore, the messaging application 112.

In one or more embodiments, the user client device(s) 108 correspond to one or more user accounts (e.g., user accounts stored at the server(s) 102). For example, a user of one of the client device(s) 108 can establish a user account with login credentials. The server(s) 102 can transmit messages between user client device(s) 108 utilizing permissions and other data associated with corresponding user accounts via the messaging application 112. Accordingly, users can utilize multiple devices (e.g., multiple transmitting client devices or multiple receiving client devices) with the appropriate privileges associated with the corresponding user accounts. The present disclosure utilizes client devices to refer to devices associated with these user accounts. Thus, in referring to a client device, the disclosure and the claims are not limited to communications with a specific device, but any device corresponding to an account of a particular user associated with the messaging system 106 utilizing the messaging application 112.

In addition, the server(s) 102 can communicate with the user client device(s) 108 via the network 110. For example, the user client device(s) 108 can transmit or receive a message via the network 110 and the server(s) 102. Further, the user client device(s) 108 and/or the server(s) 102 can transmit instructions for generating and providing a graphical effect for a messaging thread via the network 110.

Figure 2:
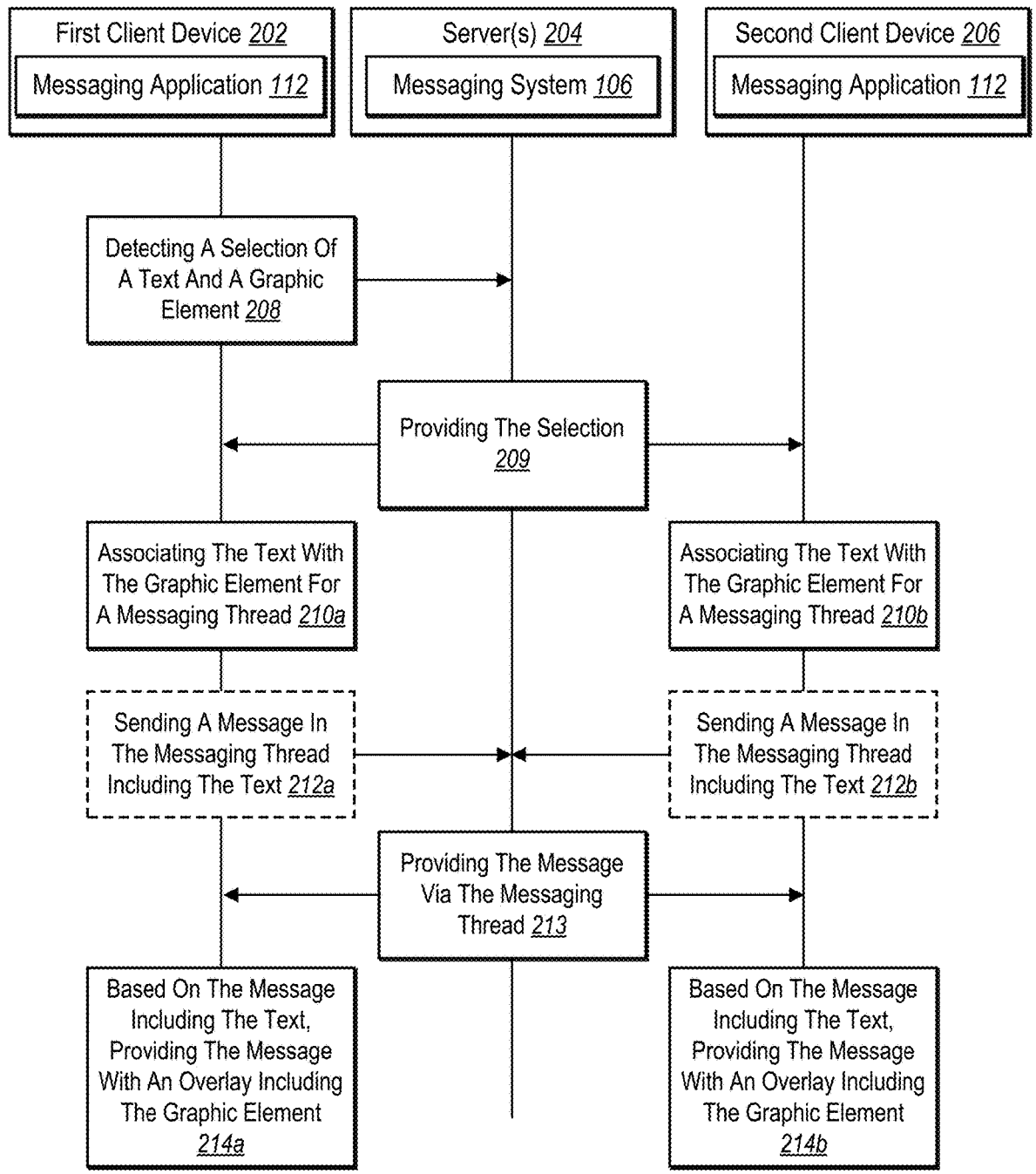
FIG. 2 illustrates an overview of a process of assigning a graphic element with content and a messaging thread in accordance with one or more embodiments.

As discussed above, the messaging system 106 can provide a message with a graphical element associated with text for a messaging thread. For instance, FIG. 2 illustrates an overview of the process for generating and providing a graphical effect including one or more instances of a graphic element. FIG. 2 illustrates a first client device 202, server(s) 204 including the messaging system 106, and a second client device 206. Each of the first client device 202 and the second client device 206 implements the messaging application 112. It will be appreciated that the first client device 202 and the second client device 206 are given by way of illustration, and the messaging system 106 can facilitate messaging threads among any number of client devices.

As shown in FIG. 2, a first client device 202 performs an act 208 of detecting a selection of text and a graphic element. More specifically, in one or more embodiments, the first client device 202 detects selection of a graphic element from a menu including a variety of graphic elements. Additionally, in some embodiments, the first client device 202 receives user selection of corresponding text, including via a keyboard or digital keyboard.

Further, as shown in FIG. 2, the first client device 202 can provide the selection of the text and the graphic element to server(s) 204. Further, the server(s) 204 can perform an act 209 of providing the selection to each client device associated with the messaging thread. In one or more embodiments, the server(s) 102 organize the data associating the text with the graphic element. Additionally, in some embodiments, based on receiving the user selections, the messaging system 106 generates instructions for generating an overlay including the corresponding graphic element. As shown in FIG. 2, the server(s) 204 provide the selection to the first client device 202 and the second client device 206. In one or more embodiments, the server(s) 204 also provide the instructions for generating the overlay to the first client device 202 and the second client device 206. In particular, once the server(s) 204 provide the association (or a list of associations) between content and graphical elements, the server(s) 204 are passive in the workflow (i.e., they are only used to pass information between the client devices). In this manner the messages can be encrypted and the client devices can still provide the graphical effects.

In one or more embodiments, in response to receiving the selection, as shown in FIG. 2, the first client device 202 performs an act 210a and the second client device 206 performs an act 210b of associating the text with the graphic element for a messaging thread. More specifically, in one or more embodiments, the first client device 202 and the second client device 206 receive data indicating the text, the graphic element, and the corresponding messaging thread. In some embodiments, the first client device 202 and the second client device 206 store the association, including in metadata corresponding to the messaging thread. For example, the first client device 202 and the second client device 206 store the association in matching table with other associations associated with the messaging thread.

Additionally, as shown in FIG. 2, the first client device 202 performs an optional act 212a and the second client device 206 performs an optional act 212b of sending a message in the messaging thread including the text. In one or more embodiments, either or both of the first client device 202 and the second client device 206 can receive user input including selection of the text during generation of the message. As shown in FIG. 2, the first client device 202 and/or the second client device 206 provide the message to the server(s) 204.

In one or more implementations, the client device at which the message including the text is entered preforms a matching to determine that the text was entered as described below. In response to determining that text has been entered that maps to a text/graphical element association stored in a matching table on the client device, the client device sends the message including the text, metadata indicating that the matching was found, and an indication of the string of characters that was matched (e.g., an indication of characters 5-13). The receiving device then looks up the match and surfaces the graphical effect when entering the message into the messaging thread.

As also shown in FIG. 2, the server(s) 204 perform an act 213 of providing the message via the messaging thread. In one or more embodiments, the first client device 202 and the second client device 206 present the message via the messaging thread. Further, as shown in FIG. 2, the first client device 202 performs an act 214a and the second client device 206 performs an act 214b of, based on the message including the text, providing the message with an overlay including the graphic element.

More specifically, in one or more embodiments, the first client device 202 and the second client device 206 detect that the message presented in the messaging thread includes the text. Based on this detection and based on the stored association between the graphic element and the text, in some embodiments, the first client device 202 and the second client device 206 generate an overlay including the graphic element. In one or more embodiments, the first client device 202 and the second client device 206 utilize instructions that the server(s) 204 provided for generating the overlay.

In some embodiments, the first client device 202 and the second client device 206 generate the overlay by generating one or more instances of the graphic element and motion path(s) for the instances of the graphic element. In addition, or in the alternative, the first client device 202 and the second client device 206 generate animations by generating frames including motion of and/or changes to the graphic element. In some embodiments, the first client device 202 and the second client device 206 present the overlay over a graphical user interface including the messages for the messaging thread.

Figure 3D:
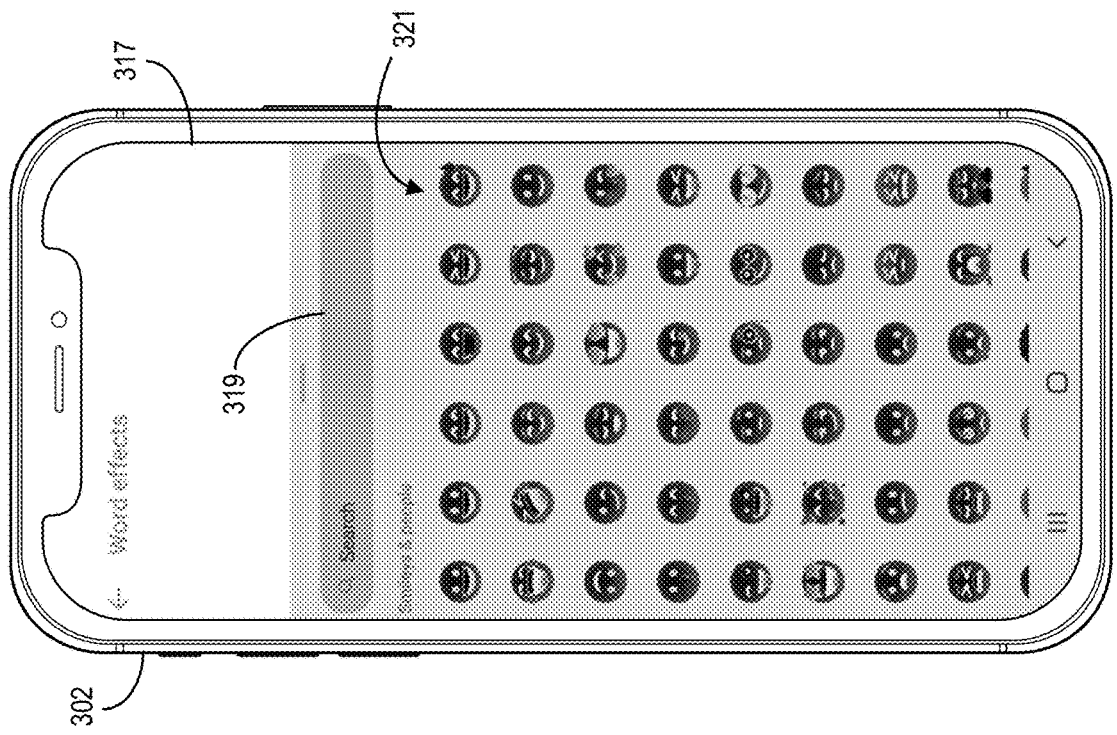

FIGS. 3A-3E illustrate example graphical user interfaces for generating an association between a graphic element and text for a messaging thread. More specifically, FIGS. 3A-3E illustrate a client device 302 presenting various graphical user interfaces in a process of generating the association between the graphic element and the text. FIG. 3A illustrates the client device 302 presenting a messaging thread options graphical user interface 304. The messaging thread options graphical user interface 304 includes information about a corresponding messaging thread and various options for the messaging thread.

More specifically, the messaging thread options graphical user interface 304 includes the thread name "Book Club" and icons or photos corresponding to users in the messaging thread. The messaging thread options graphical user interface 304 also includes various selectable options corresponding to the messaging thread. In one or more embodiments, in response to detecting user interaction with selectable options in the messaging thread options graphical user interface 304, the client device 302 presents graphical user interfaces corresponding to that option.

For example, as shown in FIG. 3A, the messaging thread options graphical user interface 304 includes a word effects option 308. As shown in FIG. 3A, the word effects option 308 includes a magic wand icon and the text "Word Effects." In one or more embodiments, in response to receiving user interaction at the word effects option 308, the client device 302 presents an association generation graphical user interface for making and modifying associations between text and graphic elements for the messaging thread.

Additionally, as shown in FIG. 3A, the messaging thread options graphical user interface 304 includes a messaging theme option 309. As illustrated in FIG. 3A, the messaging theme option 309 includes a small dot indicating a current messaging theme and the text "Theme." In some embodiments, in response to receiving user interaction at the messaging theme option 309, the client device 302 presents a messaging theme graphical user interface for selecting messaging themes for the messaging thread.

FIG. 3B illustrates the client device 302 displaying an association generation graphical user interface 311. As shown in FIG. 3B, the association generation graphical user interface 311 includes an association explanation 314. More specifically, the association explanation 314 includes the text "Add effects to your chat. Pair words that have special meaning with fun effects. Everyone will see an animation whenever these words are used." The association explanation 314 also includes a selectable option to "Learn More." However, it will be appreciated that the messaging system 106 can generate the association explanation in a variety of ways including a variety of text for various implementations.

The association generation graphical user interface 311 also includes a listing of suggested associations 316. The listing of suggested associations 316 are selectable options corresponding to predetermined graphic elements and text for quick implementation. To illustrate, in FIG. 3B, the listing of suggested associations 316 include a teacup graphic element and the text "spill the tea," a 100 graphic element and the text "facts," a goat graphic element and the text "goat," a crown graphic element and the text "queen," and a fireworks graphic element and the text "fancy."

However, it will be appreciated that the messaging system 106 can generate the listing of suggested associations 316 including a variety of text and graphic elements. To illustrate, in one or more embodiments, the messaging system 106 generates a listing of suggested associations between text and graphic elements by analyzing the messaging thread and identifying text from the messaging thread associated with graphic elements utilized in the messaging thread. In addition, or in the alternative, the messaging system 106 can generate suggested associations based on administrator input. In alternative embodiments, the messaging system 106 can generate suggested associations using historical information or a machine learning model as described below in relation to FIG. 7.

In one or more embodiments, in response to detecting user input of one of the listing of suggested associations 316, the client device generates an association between the selected graphic element and the selected text. Further, as discussed above with regard to FIG. 2, the client device 302 provides the association to the messaging system 106 and/or each client device associated with the messaging thread. Accordingly, each client device associated with the messaging thread makes the same association from the user selection at the listing of suggested associations 316.

In addition to generating predetermined associations, the messaging system 106 and the client device 302 can generate custom associations between graphic elements and text. As also shown in FIG. 3B, the association generation graphical user interface 311 includes a graphic element selection button 310 and a text bar 312. In one or more embodiments, the client device 302 can generate associations between graphic elements selected via the graphic element selection button 310 and corresponding text detected via the text bar 312.

Figure 3C:
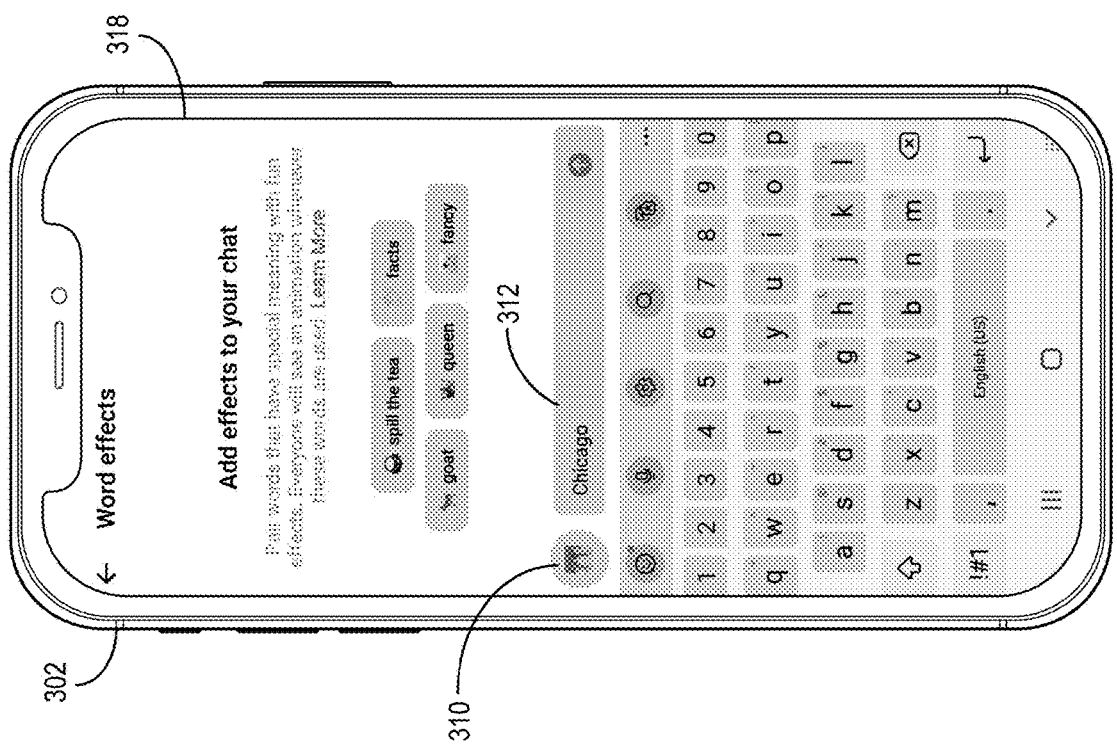

To illustrate, as shown in FIG. 3C, in response to detecting user interaction with the text bar 312, the client device 302 provides a text input graphical user interface 318. The text input graphical user interface includes the graphic element selection button 310 and the text bar 312. The text input graphical user interface also includes a virtual keyboard for generating text. However, in one or more embodiments, the client device 302 can receive user input indicating text for association with a graphic element from various input types. For example, in a personal computer implementation, the client device 302 can receive user input via a physical keyboard.

As shown in FIG. 3C, the graphic element selection button 310 includes a graphic element depicting a city and the text bar 312 includes the text "Chicago." In one or more embodiments, the client device 302 presents the graphic element selection button 310 including the graphic element depicting a city and the text bar 312 including the text "Chicago" based on user selection of the graphic element and the text. In one or more embodiments, based on receiving this user input, the client device 302 generates an association between the text "Chicago" and the graphic element depicting the text. Further, as mentioned above, the client device 302 can provide the association to the messaging system 106 and/or each client device associated with the messaging thread.

In one or more embodiments, the messaging system 106 utilizes various rules for association of words or phrases with graphic elements. For example, the messaging system 106 can utilize a rule that causes a client device to provide an overlay if the entirety of a message matches the associated text. In addition, in some embodiments, the messaging system 106 utilizes a rule that causes a client device to provide an overlay if a message includes the associated text, without regard to any additional text included in the message. Further, in one or more embodiments the messaging system 106 utilizes utilize a rule that causes a client device to provide an overlay if one or more of a set of words are included in a message in a messaging thread. Additionally, the messaging system 106 can utilize a variety of algorithms and/or rules to utilize the associations between text and graphic elements to determine whether and how a client device presents an overlay over a graphical user interface.

Further, in some embodiments, in response to receiving user selection of the association, the client device 302 can present a message within the messaging thread indicating the selection of the messaging theme. Additionally, in one or more embodiments, the client device 502 provides the message (e.g., via the messaging system 106) to each other client device associated with the messaging thread. Thus, each client device associated with the messaging thread can present the message indicating the new association between text and a graphic element for the messaging thread.

In one or more embodiments, in response to receiving user selection of the graphic element selection button 310, the client device 302 provides a graphic element selection graphical user interface. To illustrate, as shown in FIG. 3D, the client device 302 presents the graphic element selection graphical user interface 317. As shown in FIG. 3D, the graphic element selection graphical user interface 317 includes a graphic element search bar 319 and a graphic element display area 321. A user can scroll through the graphic element display area 321 to find a desired graphic element or can enter a search term to aid in finding a desired graphic element.

Figure 3E:
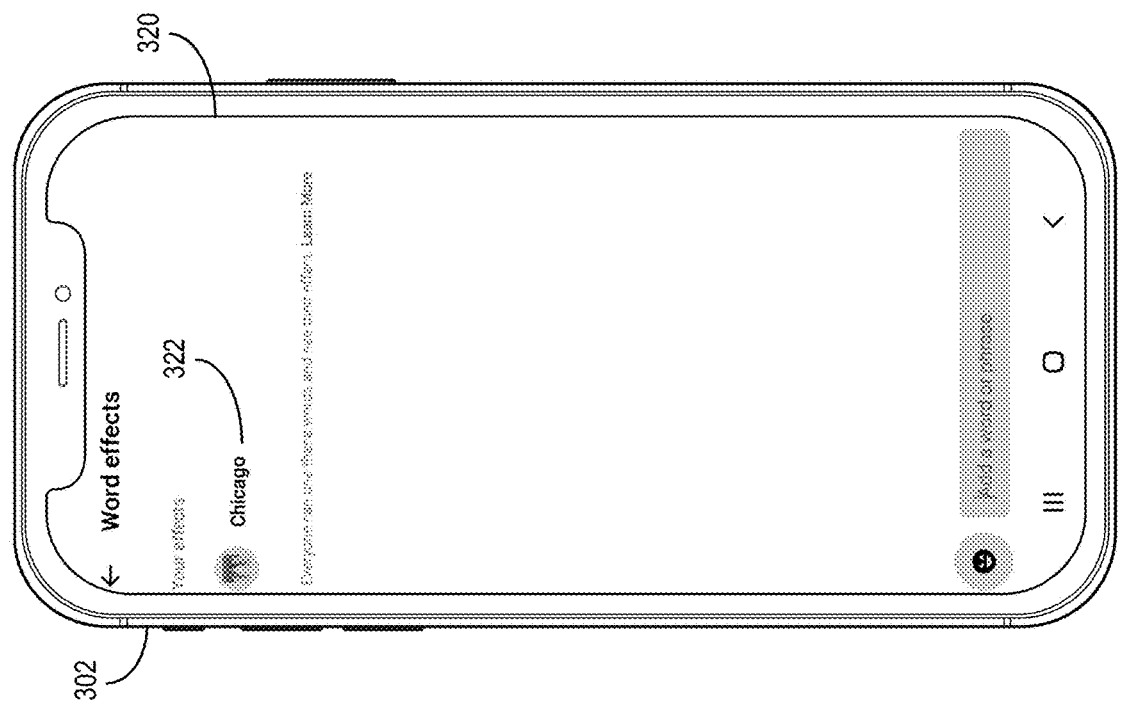

Turning to FIG. 3E, the client device 302 can also present information for existing associations between text and graphic elements. As shown in FIG. 3E, the client device 302 can present the existing associations graphical user interface 320. As also shown in FIG. 3E, the existing associations graphical user interface 320 includes the existing association 322. The existing association 322 includes the graphic element depicting a city and the text "Chicago."

To illustrate, as shown in FIG. 3C, the client device 302 received user input selecting the graphic element depicting a city and the text "Chicago" for association. Thus, the client device 302 generated an association between the graphic element depicting a city and the text "Chicago." Further, as shown in FIG. 3E, the client device 302 presents the existing associations graphical user interface 320 including the existing association 322 as an indication of the association between the text and the graphic element. In one or more embodiments, in response to receiving user input at the existing association 322, the client device 302 can present graphical user interfaces for deleting and/or modifying the existing association.

For example, in one or more embodiments, the messaging system 106 receives user input updating text associated with a graphic element. Thus, based on the updated text, the messaging system 106 can provide an overlay including the associated graphic element in response to detecting a message in the corresponding messaging thread including the updated text. In another example, in some embodiments, the messaging system 106 receives user input modifying a graphic element associated with text. Thus, based on the updated graphic element, the messaging system 106 can provide an overlay including the updated graphic element in response to detecting a message in the corresponding messaging thread including the text.

Figure 4B:
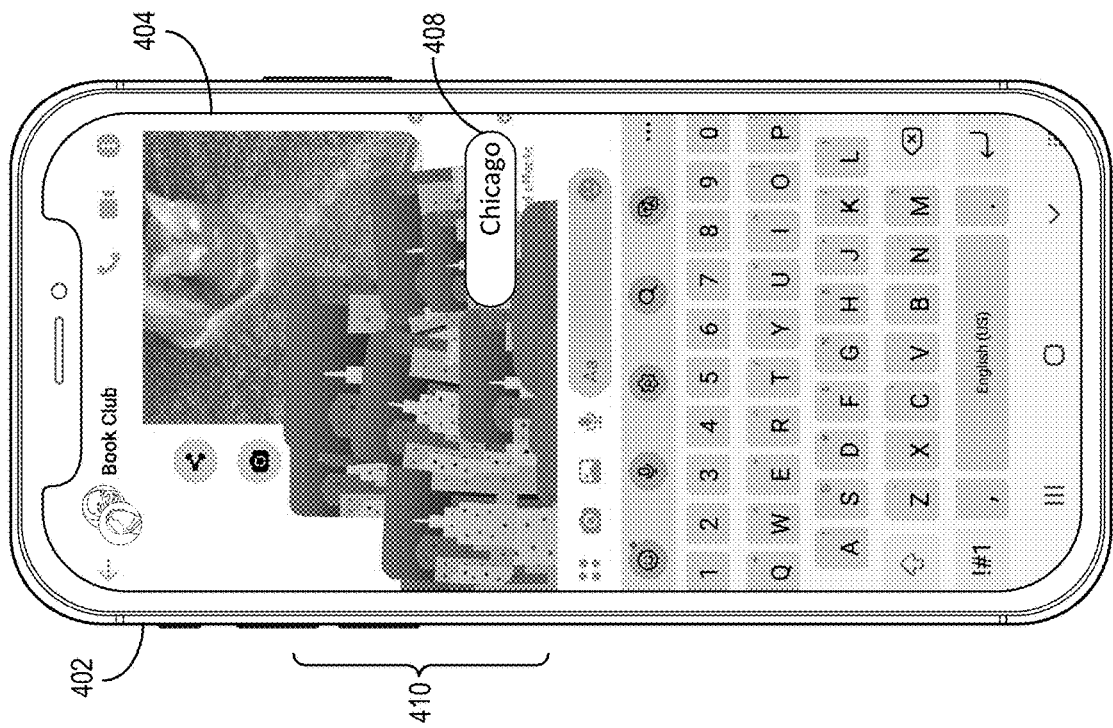
FIGS. 4A-4B illustrate example messaging thread graphical user interfaces surfacing a graphical element in response to associated text being entered into the messaging thread in accordance with one or more embodiments.
Figure 4A:
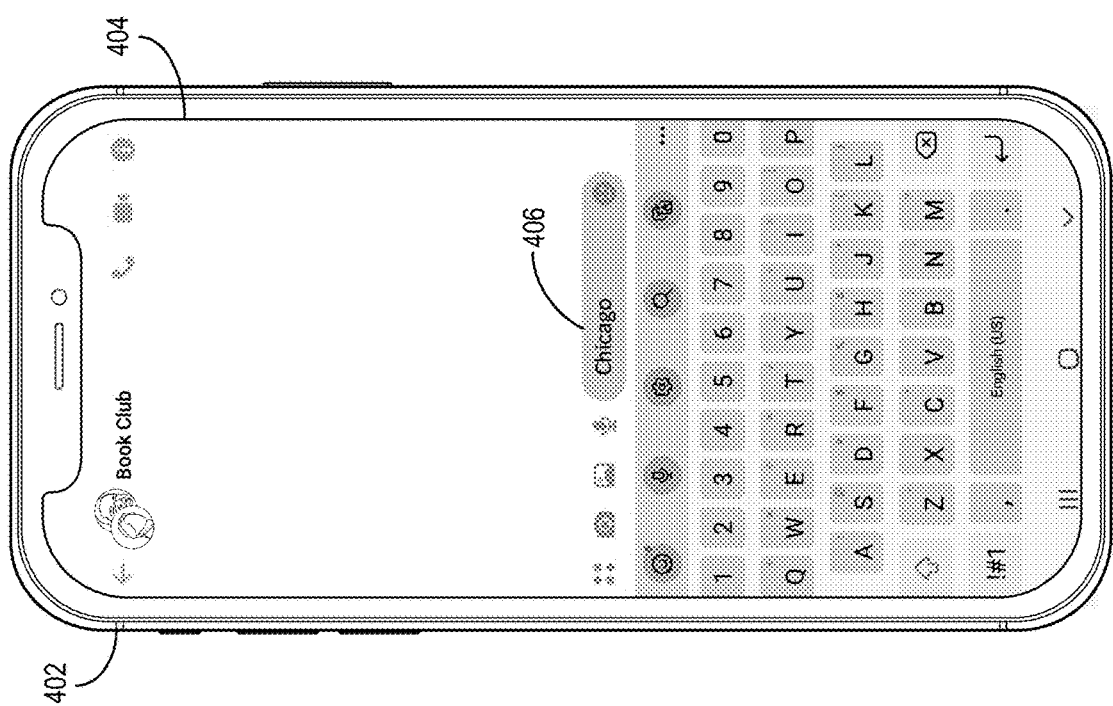

As mentioned above, the messaging system 106 can provide a graphical effect over a messaging thread in response to content entered into the messaging thread. More specifically, a client device 302 can present an overlay including a graphic element in response to detecting a message added to the messaging thread that includes associated text. FIGS. 4A-4B illustrate a client device 402 presenting a messaging thread graphical user interface 404 and providing such an overlay over the messaging thread graphical user interface 404.

FIG. 4A illustrates the client device presenting the messaging thread graphical user interface 404. As shown in FIG. 4A, the messaging thread graphical user interface 404 includes the message bar 406. The message bar 406 includes the text "Chicago." Additionally, in one or more embodiments, the messaging thread graphical user interface 404 includes various messages for the messaging thread. As discussed above, these messages can include text, visual media, audio media, and various multimedia.

FIG. 4B illustrates the messaging thread graphical user interface 404 as the message 408 is entered into the messaging thread. The message 408 includes the text "Chicago." In response to receiving user input sending the message 408 in the messaging thread, the client device 402 displays the message 408 in the messaging thread graphical user interface 404. Further, the client device 402 detects that the message 408 includes the text "Chicago," and determines that the text "Chicago" is associated with a graphic element for this messaging thread.

In one or more embodiments, the messaging application 112 of the messaging system 106 detects the text as it is being typed to determine if the text includes content associated with a graphical element. More specifically, in some embodiments, the messaging system 106 utilizes a trie-based algorithm determine a match.

In one or more embodiments, the client device 402 stores associations between text and graphic elements in a matching table on the client device 402. The client device 402 checks the list in response to sending the message to the messaging thread. In some embodiments, based on identifying the text in the message matches an entry on the matching table, the messaging system 106 sends the message with metadata indicating the matching that was found and the string of words that was matched. Thus, any receiving client devices can efficiently detect the text and the associated graphic element and provide an overlay accordingly.

In some embodiments, the messaging system 106 pre-computes word boundary indexes utilizing a regular expression tester with syntax highlighting. In one or more embodiments, the messaging system 106 organizes sets of words associated with each graphic element in a tree with various search terms organized under a graphic element. Upon receiving user input indicating one or more text characters via the message bar 406, the messaging system 106 scans the search text character by character. In one or more embodiments, the messaging system 106 identifies a partial match with the existing characters in the message bar 406. In one or more embodiments, the messaging system 106 iteratively determines whether each following character is included as it is entered by following the search tree.

To illustrate, for each partial match, upon receiving an additional character via the message bar 406, the messaging system 106 checks all existing matches for the additional character. The messaging system 106 can consider partial matches that do not continue to match the additional characters as diverged and can abandon those paths through the search tree accordingly.

The messaging system 106 can also check if successfully advanced partial matches point to a terminal node of the search tree. Additionally, in one or more embodiments, the messaging system 106 checks whether successfully advanced partial matches are full matches. For full matches, the messaging system 106 can also remove the search path to improve efficiency and conserve computing resources. Further, the messaging system 106 can continue to provide other partial matches. For example, the term "happy" may return a full match for a smiley face graphic element with the term "happy" in its search node and a partial match for a party popper graphic element with the term "happy birthday" in its node. In this example, the messaging system 106 can provide both the smiley face graphic element and the party popper graphic element in response to receiving "happy" via the message bar 406.

Accordingly, by utilizing the search tree, the messaging system 106 can search including characters as the messaging system 106 receives them. Thus, the messaging system 106 does not need to recalculate for each association each time the messaging system 106 receives a character. In addition, or in the alternative, in one or more embodiments, the messaging system 106 can run the search tree in response to a user sending or finalizing an entry of text.

In addition to utilizing the search tree character by character, the messaging system 106 can also utilize the search tree in response to multiple characters entered at once. For example, the messaging system 106 can run the search tree from the most recent search tree state in response to an automatic completion of a word. In addition, the messaging system 106 can run the search tree from the most recent relevant query after an automatic correction to the text. Further, the messaging system 106 can run a search tree from the most recent relevant text after a manual correction (e.g., deleting and re-typing) in order to conserve computing resources.

To determine the most recent relevant text, in one or more embodiments, the messaging system 106 performs a rewinding to determine the most recent previous state of the search tree that corresponds to the updated text. For example, if the term "flowed" is corrected to the search term "flowers," the messaging system 106 can rewind the search tree to its state when it ran for the search term "flowe" and run "flowers" instead of "flowed." To rewind to this previous state, the messaging system 106 can re-start a word index with an edited range. For this example, the messaging system 106 modifies the range to include the first five characters instead of characters one through six. Accordingly, the messaging system 106 returns the search tree to the state it was at when it was searching the first five characters.

Further, in one or more embodiments, the messaging system 106 can scan the updated text to determine updated boundaries for the term. For the example where the updated term is "flowers," the messaging system 106 identifies seven characters and accordingly determines a seven-character term boundary. Thus, the messaging system 106 can run the search tree with the updated term and updated term boundary. In one or more embodiments, the messaging system 106 re-starts the search by forgetting any full matches.

Further, the re-search process can include tracking and skipping divergent partial matches. To illustrate, the messaging system 106 immediately forgets divergent partial matches. However, in one or more embodiments, the messaging system 106 may re-discover one or more of these partial matches based on subsequent updates to the search text. Accordingly, the messaging system 106 continues to track divergent partial matches but skips them on each character iteration. This, previously divergent partial matches can be recognized.

Based on this determination and the association between the text "Chicago" and the graphic element depicting a city described with regard to FIGS. 3A-3E, the client device 402 generates an overlay 410 including the graphic element depicting a city. As shown in FIG. 4B, the overlay 410 includes many instances of the graphic element depicting a city in motion across the messaging thread graphical user interface 404. As shown in FIG. 4B, the client device 402 can provide the overlay 410 over and/or under one or more portions of the messaging thread graphical user interface 404. For example, the client device 402 provides the overlay 410 under the message 408 but over the other messages in the thread. Additionally, the client device 402 can determine whether to provide the overlay over or under various graphical user interface elements.

Further, in one or more embodiments, the client device 402 can provide the overlay indefinitely or for a temporary duration. For example, the client device 402 can provide the overlay for a predetermined period of time. In addition, or in the alternative, the client device 402 provides the overlay until the client device 402 detects user input.

Additionally, the messaging system 106 provides instructions to each other client device associated with the messaging thread to generate and provide the overlay 410. Further, the messaging system 106 can generate and provide instructions for various types of overlays. To illustrate, the messaging system 106 can generate and provide instructions for overlays that show animations of the graphic elements. For example, in one or more embodiments, the messaging system 106 generates and provides instructions for generating an animation that modifies the sizes or shapes of graphic elements. In another example, the messaging system 106 generates and provides instructions for generating an animation that shows changes in the facial expression of a graphic element.

Further, in one or more embodiments, the messaging system 106 can determine that a message includes multiple pieces of text that are each associated with a different graphic element. The messaging system 106 can also determine that a single piece of text is associated with multiple graphic elements. In either case, the messaging system 106 can provide instructions to client devices for generating an overlay that includes multiple graphic elements. For example, a client device can generate an overlay by generating animation paths for graphic elements and placing a first graphic element along half of the animation paths and a second graphic element along the other half of the animation paths. Similarly, a client device can generate an overlay with additional graphic elements by further dividing animation paths.

Additionally, because the client device 402 generates and presents the overlays, the messaging system 106 can facilitate messaging thread utilization of these overlays even for messaging threads with end-to-end encryption. To illustrate, the servers associated with the messaging system 106 do not need to store any user data. Instead, the servers can maintain end-to-end encryption and provide data from device to device, including associations and instructions to generate and present overlays.

As mentioned above, in one or more embodiments, the messaging system 106 can apply messaging themes to messaging threads. More specifically, in one or more embodiments, the messaging system 106 receives and implements associations between text and graphic elements included in messaging themes. FIGS. 5A-5B illustrate a client device 502 detecting user selection of a messaging theme and corresponding associations between text and graphic elements.

For example, as shown in FIG. 5A, the client device 502 presents a messaging theme graphical user interface 504. The messaging theme graphical user interface 504 includes various options for messaging themes. As mentioned, the messaging themes can include associations between text and graphic elements to facilitate generation of overlays for the messaging thread. In addition, in one or more embodiments, the messaging system 106 provides messaging themes to the client device 502 that include visual and/or audio changes to the messaging thread.

To illustrate, a messaging theme can include an image for presentation as a backdrop for messages in the messaging thread. In addition, or in the alternative, in some embodiments, a messaging theme includes changes to a color scheme for the messaging thread, including the color of sent or received messages, the color of selectable options, etc. In one or more embodiments, a messaging theme can also include associated background music for a client device to play while the messaging thread is open. Further, in some embodiments, a messaging theme includes modification to a notification sound and/or vibration associated with the messaging theme. In one or more embodiments, a messaging theme includes designated haptic feedback. In addition to these changes, a messaging theme can include a variety of other tactile, visual, and/or audio modifications.

As shown in FIG. 5A, the messaging theme graphical user interface 504 includes the messaging theme menu 506. The messaging theme menu 506 includes the text "Customize your chat" and a variety of messaging theme options. To illustrate, the messaging theme menu 506 includes a messaging theme 508 represented in the messaging theme menu 506 by the text "Lunar New Year" and a tiger icon.

Additionally, the messaging theme menu 506 includes messaging theme options such as "Lo-Fi," "Sky," "Celebration!" "Chill," and "Stranger Things." However, it will be appreciated that the client device 502 can present the messaging theme menu 506 including a variety of messaging themes. To illustrate, the client device 502 can present messaging themes received from the messaging system 106. In some embodiments, the messaging system 106 provides messaging themes based on administrator input.

In one or more embodiments, in response to receiving user input with one or more messaging themes in the messaging theme menu 506, the client device 502 applies any designated modifications included in the messaging theme to the messaging thread. For example, based on receiving user interaction at the messaging theme 508, the client device 502 applies designated modifications to the messaging thread.

To illustrate, FIG. 5B shows the client device 502 presenting an existing association graphical user interface 510. The existing association graphical user interface 510 includes messaging theme associations 512 and an existing association 514. As shown in FIG. 5B, in response to receiving user selection of the messaging theme 508, the client device 502 generates the messaging theme associations 512. The messaging theme associations 512 include the text "Tiger" associated with a graphic element depicting a tiger, the text "Luck" associated with a graphic element depicting concentric circles and stars, and the text "Happy New Year" associated with fireworks.

However, it will be appreciated that theme associations can include a variety of text and graphic elements. More specifically, based on detecting user selection of a messaging theme, the client device 502 retrieves designated modifications associated with the messaging theme. In one or more embodiments, the client device 502 utilizes the retrieved modifications to apply each modification to the messaging thread. Thus, messaging theme associations between text and graphic elements can include a variety of text and graphic elements based on data associated with the messaging theme.

Further, in some embodiments, the client device 502 sends a notification of the modifications to each other client device associated with the messaging thread. Thus, the associated client devices can each apply the messaging theme to the messaging thread. Accordingly, in one or more embodiments, each other client device associated with the messaging thread utilizes the received notification to generate the designated associations between text and graphic elements.

Additionally, similar to the discussion above with regard to FIG. 3C, in response to receiving user selection of the messaging theme, the client device 502 can present a message within the messaging thread indicating the selection of the messaging theme. Similarly, the client device 502 can provide the message (e.g., via the messaging system 106) to each other client device associated with the messaging thread. Accordingly, each client device associated with the messaging thread can present the message indicating selection of the messaging theme. Further, as discussed above, the client device 502 and other client devices associated with the messaging thread can generate and provide overlays based on messaging theme associations between text and graphic elements.

Figure 6:
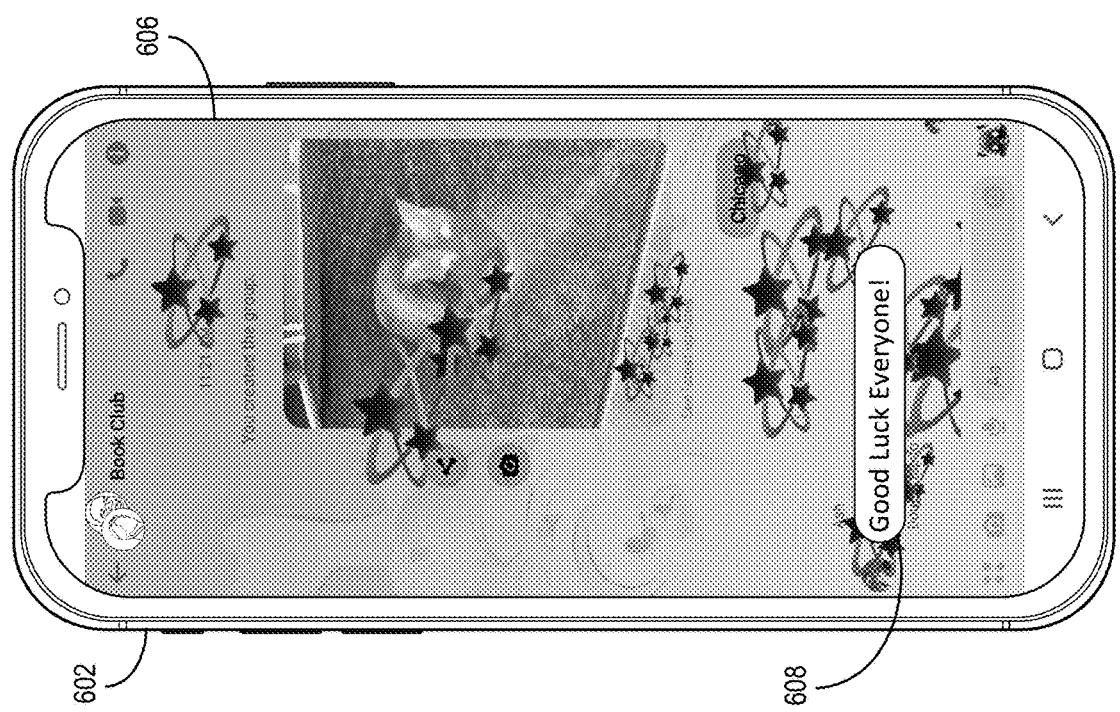
FIG. 6 illustrates and example messaging thread graphical user interface with an associated messaging theme applied in accordance with one or more embodiments.

FIG. 6 illustrates the client device 602 presenting a messaging thread graphical user interface 606 with a messaging theme applied. To illustrate, the client device 602 presents the messaging thread graphical user interface 606 including a background image related to the lunar new year based on user selection of the "Lunar New Year" theme. Additionally, as mentioned above, the messaging theme can include further modifications, such as theme music or color changes to the messaging thread.

FIG. 6 illustrates the client device 602 presenting a message 608 in the messaging thread including text associated with a graphic element. More specifically, the messaging theme includes an association between the text "luck" and a graphic element depicting concentric circles and stars. Accordingly, as shown in FIG. 6, based on detecting the inclusion of the text "luck" in the message 608, the client device 602 generates and provides an overlay over the messaging thread including the graphic element depicting concentric circles and stars.

As shown in FIG. 6, the client device 602 generates the overlay utilizing the association between the text "luck" and graphic element depicting concentric circles and stars included in the messaging theme. As discussed in greater detail above with regard to FIG. 4B, the client device 602 generates the overlay by generating motion paths and placing the graphic element depicting concentric circles and stars along the motion paths. However, as also discussed above with regard to FIG. 4B, the client device 602 can generate an overlay including an animation, including multiple graphic elements, etc.

Figure 7:
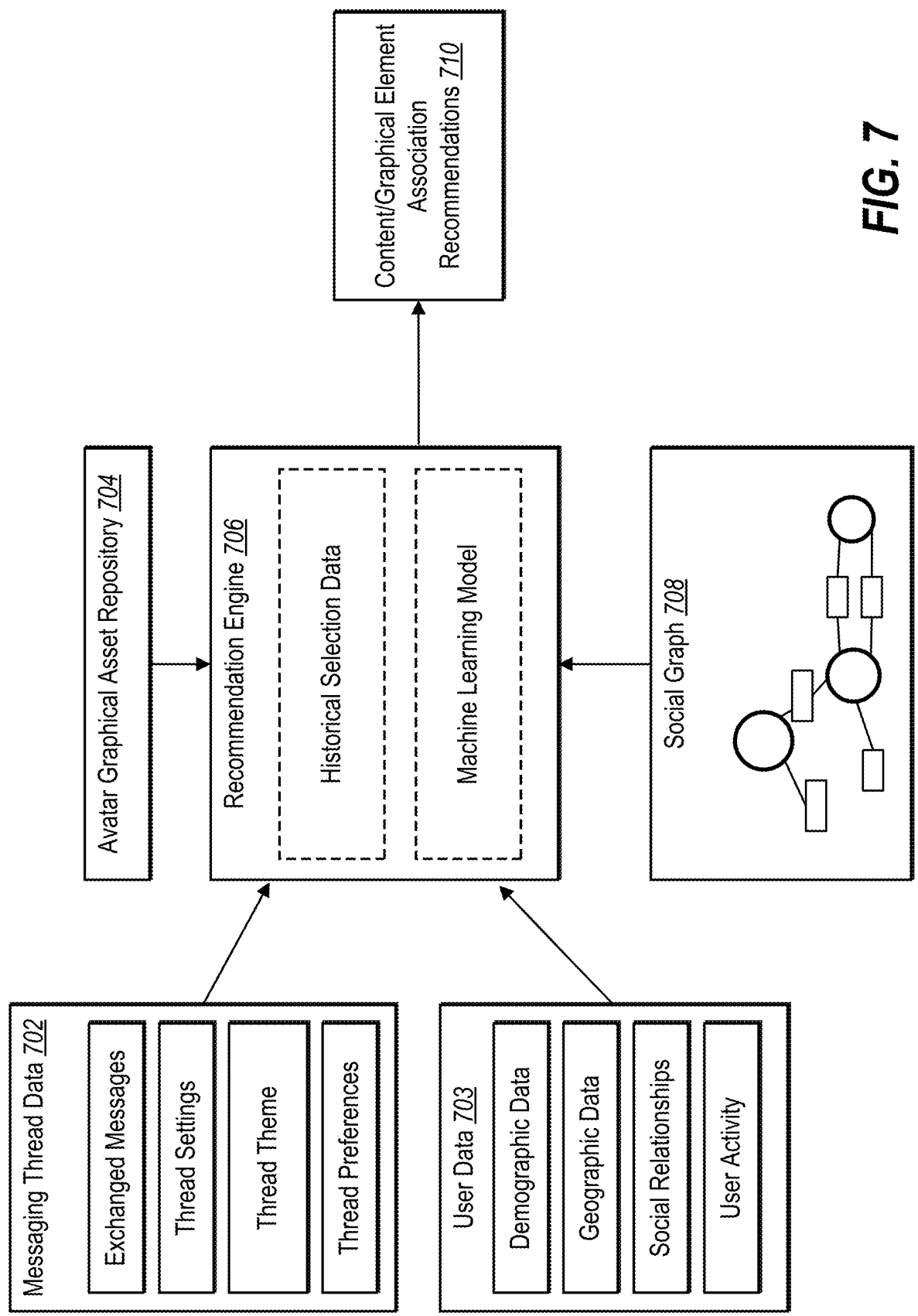
FIG. 7 illustrates a messaging system utilizing a recommendation engine to determine recommended content/ graphical element association recommendations in accordance with one or more implementations

As mentioned above, in one or more embodiments, the messaging system 106 utilizes a recommendation engine to determine relevant content and graphical element associations to recommend. For example, FIG. 7 illustrates the messaging system 106 utilizing a recommendation engine. In particular, FIG. 7 illustrates the messaging system 106 utilizing a recommendation engine to identify content-graphical element association recommendations and, subsequently, providing the content-graphical element association recommendations for display as shown above in relation to FIG. 3B.

As shown in FIG. 7, the messaging system 106 identifies messaging thread data 702 and user data 703 (e.g., for users participating in a given messaging thread). As shown in FIG. 7, the messaging system 106 utilizes the messaging thread data 702 and the user data 703 with a recommendation engine 706 to determine content-graphical element association recommendations 710. Indeed, as illustrated in FIG. 7, the messaging system 106 utilizes a recommendation engine 706 (based on historical selection data and/or a machine learning model) that utilizes a graphical-element library 704 and a social graph 708 with the messaging thread data 702 and the user data 703 to determine content-graphical element association recommendations 710 that are relevant to the messaging thread and a user interacting with the messaging thread.

As used herein, the term "machine learning model" refers to a computer-based model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree), a generative adversarial neural network, and/or a regression model.

In some embodiments, the messaging system 106 identifies and utilizes messaging thread data (e.g., messaging thread data 702) with a recommendation engine (e.g., the recommendation engine 706). As shown in FIG. 7, the messaging thread data 702 can include, but is not limited to, various combinations of exchanged messages, theme, number of users, and/or thread preferences/settings.

For example, the messaging thread data can include data, such as, but not limited to, messaging thread theme that represent a category or purpose for the messaging thread. For instance, messaging thread theme can indicate whether a messaging thread is of a particular purpose (e.g., private, public, social, business, casual, gaming, educational, work-related, dating, sport entertainment, music entertainment, movie entertainment).

In some cases, the messaging thread data includes, but is not limited to, descriptors (e.g., metadata or descriptors describing the messaging thread) such as a title of the thread or a selected theme name. In one or more implementations, the messaging thread data includes past message exchanged in the thread, including a list of prior graphical elements used. In one or more embodiments, the messaging thread data includes preferences/setting for the messaging thread (e.g., configured by a developer computing device or administrator device corresponding to the messaging thread).

Furthermore, in one or more embodiments, the messaging system 106 identifies and utilizes user data (e.g., user data 703) with a recommendation engine (e.g., the recommendation engine 706). In certain instances, the messaging system 106 identifies the user data from user account profiles on a social networking system 104 for the users in the messaging thread. For example, as shown in FIG. 7, the user data 703 can include, but is not limited to, various combinations of demographic data, geographic data, social relationships, and/or user activity data.

As an example, user data can include data, such as, but not limited to, demographic data (e.g., gender, age, employment, race, income), geographic data (e.g., current location, residence, employment location), social relationships (e.g., contacts, social network friend, social network family members, blocked users, relationship status), and/or user activity (e.g., historical user activity). In some implementations, user data can also include data, such as, but not limited to, user affiliations (e.g., social network groups, played games, purchases), user preferences (e.g., privacy preferences, communication preferences, avatar representation preferences), and/or user statuses (e.g., a selected mood within a social networking profile, a status within a social networking profile).

As further shown in FIG. 7, the messaging system 106 utilizes the messaging thread data 702 and the user data 703 with the recommendation engine 706. For example, provides the messaging thread data 702 and the user data 703 to the recommendation engine 706 and the recommendation engine 706 utilizes the input data with the graphical-element library 704 to identify the content-graphical element association recommendations 710. The content-graphical element association recommendations 710 include text and a graphical element that are selected based on the messaging thread data 702 and the user data 703.

As further shown in FIG. 7, in some cases, the messaging system 106 utilizes the recommendation engine 706 with historical selection data. In particular, the messaging system 106 can utilize historical trends of content/graphical element selections in relation to other messaging threads. For example, the messaging system 106 can rank graphical elements from the graphical-element library 704 based on historical user selections of graphical elements for user selected content/graphical element associations in other threads.

In some instances, the messaging system 106 further utilizes the social graph 708 to identify or rank historical selection trends of a user selected content/graphical element associations in other threads. For example, the messaging system 106 can apply weights to ranked content/graphical element associations utilizing historical trends from one or more users that are similar to the users corresponding to the user data 703 from the social graph 708. As an example, the messaging system 106 can identify one or more users that correspond to a high affinity (e.g., have an affinity coefficient that satisfies a preconfigured affinity threshold) to the user data. Then, the messaging system 106 can utilize the user trend data of user selected content/graphical element associations in other threads from high affinity users (from the social graph 708) to modify the ranked content/graphical element associations in other threads. For example, the messaging system 106 can utilize a social graph as described below (e.g., in relation to FIGS. 11 and 12).

In some instances, the messaging system 106 utilizes a user's historical selection data to determine content-graphical element association recommendations. For example, the messaging system 106 can identify user selected content/graphical element associations in other threads by a user and utilize the previously selected content/graphical element associations to select recommended content/graphical element associations in a current messaging thread.

Furthermore, in some cases, the messaging system 106 can, as part of historical selection data, identify affinities between user data and one or more user selected content/graphical element associations. In particular, the messaging system 106 can utilize a social graph to determine affinities between a user and one or more persons or objects from the social graph. Then, the messaging system 106 can utilize the related one or more persons or objects to identify user selected content/graphical element associations that have an affinity with the one or more persons or objects in the social graph.

In certain implementations, the messaging system 106 can rank user selected content/graphical element associations based on popularity. For example, the messaging system 106 can utilize historical social network data to rank user selected content/graphical element associations in other threads by popularity.

As also shown in FIG. 7, the messaging system 106 can utilize the recommendation engine 706 with a machine learning model. In one or more embodiments, the messaging system 106 can utilize a machine learning model to receive various combinations of input messaging thread data, user data, and/or social graph data to determine (or select) relevant graphical elements (that match the messaging thread data and user data). In some cases, the messaging system 106 can utilize a machine learning model to determine probabilities of graphical elements being selected by a user when presented. Then, the messaging system 106 can select the graphical elements using the probabilities (e.g., upon the probabilities satisfying a preconfigured threshold probability).

In one or more embodiments, the messaging system 106 utilizes the machine learning model to receive various combinations of input messaging thread data, user data, and/or social graph in order to output content/graphical element associations. In particular, the messaging system 106 can utilize a machine learning model that outputs probabilities for text or phrases that indicate a likelihood of the text or phrases being relevant to a user (and/or within a messaging thread). Then, in one or more embodiments, the messaging system 106 selects one or more text or phrases based on the probabilities corresponding to the text or phrases (e.g., utilizing a preconfigured threshold probability). Subsequently, the messaging system 106 can utilize the determined one or more text or phrases to select graphical elements that match the text or phrases for the content-graphical element recommendations.

In some embodiments, the messaging system 106 trains a machine learning model to select or determine graphical elements (or text or phrases). For example, the messaging system 106 identifies (or generates) a training data set having user data, messaging thread data, and/or social graph data and a corresponding selection for content-graphical element recommendations as ground truth data. Indeed, the messaging system 106 can identify the training data set from historical data and/or user generated training data.

Then, the messaging system 106 can provide the input data from the training data set to the machine learning model to generate predicted or determined content-graphical element recommendations. In one or more embodiments, the messaging system 106 compares the predictions to the ground truth data. Additionally, the messaging system 106 can determine a loss value that indicates an accuracy or error rate of the machine learning model predictions.

In some cases, the messaging system 106 can utilize the determined loss value to learn parameters of the machine learning model (e.g., via backpropagation). For example, the messaging system 106 can iteratively utilize a machine learning model with a training data set to determine predicted content-graphical element recommendations and compare the predictions to ground truth selections to determine a loss value. Moreover, the messaging system 106 can utilize the iterative loss value to iteratively learn parameters (e.g., as a feedback loop) of the machine learning model until a desired level of accuracy is achieved (e.g., satisfying an error threshold by being less than or equal to the error threshold). In one or more embodiments, the messaging system 106 utilizes various loss functions (or loss values). For example, the messaging system 106 can utilize loss functions (or loss values), such as, but not limited to mean square error, quadratic loss, L2 loss, squared error loss, and/or absolute error loss.

In one or more embodiments, the messaging system 106 utilizes a combination of a machine learning model and historical selection data to determine content-graphical element association recommendations. For example, in some cases, the messaging system 106 utilizes a machine learning model (with messaging thread data and user data) to determine predicted graphical elements and associated text/phrases. Then, the messaging system 106 can further rank and/or weight the predicted content-graphical element recommendations using historical selection data (e.g., historical trends, activity, or selections) in accordance with one or more implementations herein.

Figure 8:
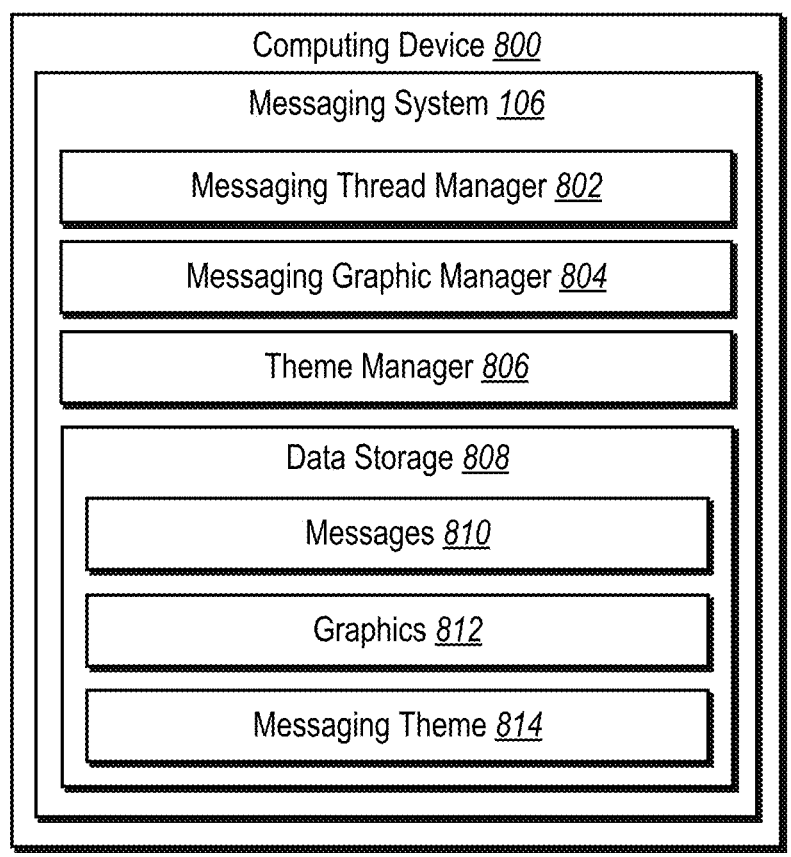
FIG. 8 illustrates a schematic diagram of a messaging system in accordance with one or more embodiments.

Turning to FIG. 8, additional detail will now be provided regarding various components and capabilities of the messaging system 106. In particular, FIG. 8 illustrates an example schematic diagram of a computing device 800 implementing the messaging system 106 in accordance with one or more embodiments. Also illustrated, the messaging system 106 can include a messaging thread manager 802, a messaging graphic manager 804, a theme manager 806, and a data storage 808.

As shown in FIG. 8, the messaging system 106 includes the messaging thread manager 802. In one or more embodiments, the messaging thread manager 802 receives user input from one or more client devices (e.g., the computing device 800) and generates messages based on the received user input for the messaging thread. Further, the messaging thread manager 802 provides the messages via various client devices in messaging thread graphical user interfaces. Additionally, in one or more embodiments, the messaging thread manager 802 tracks user accounts and client devices associated with a messaging thread.

Additionally, as shown in FIG. 8, the messaging system 106 includes the messaging graphic manager 804. In one or more embodiments, the messaging graphic manager 804 manages graphic elements and associations between graphic elements and text for messaging threads. Further, in some embodiments, the messaging graphic manager 804 generates animations and/or animation paths for graphic elements. Additionally, in one or more embodiments, the messaging graphic manager 804 provides the graphic element animation via an associated messaging threads for associated client devices.

Further, as shown in FIG. 8, the messaging system 106 includes the theme manager 806. In one or more embodiments, the theme manager 806 tracks and manages messaging themes for messaging threads. For example, in some embodiments, the theme manager 806 manages audio and/or visual elements associated with a messaging theme. Additionally, in one or more embodiments, the theme manager 806 communicates with the messaging graphic manager 804 to manage associations between graphic elements and text included in a messaging theme.

Also, as shown in FIG. 8, the messaging system 106 includes the data storage 808. The data storage 808 (e.g., via one or more memory devices) can maintain data of any type, size, or kind, as necessary to perform the functions of the social networking system 104. For example, as shown in FIG. 8, the data storage 808 may store messages 810, graphics 812, and messaging themes 814.

Each of the components 802-808 of the messaging system 106 can include software, hardware, or both. For example, the components 802-808 can include one or more instructions stored on a computer-readable storage medium and executable by processors of one or more computing devices, such as a client device or server device. When executed by the one or more processors, the computer-executable instructions of the messaging system 106 can cause the computing device(s) to perform the methods described herein. Alternatively, the components 802-808 can include hardware, such as a special-purpose processing device to perform a certain function or group of functions. Alternatively, the components 802-808 of the messaging system 106 can include a combination of computer-executable instructions and hardware.

Furthermore, the components 802-808 of the messaging system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-808 may be implemented as a stand-alone application, such as a desktop or mobile application. Furthermore, the components 802-808 may be implemented as one or more web-based applications hosted on a remote server. The components 802-808 may also be implemented in a suite of mobile device applications or "apps."

Figure 9:
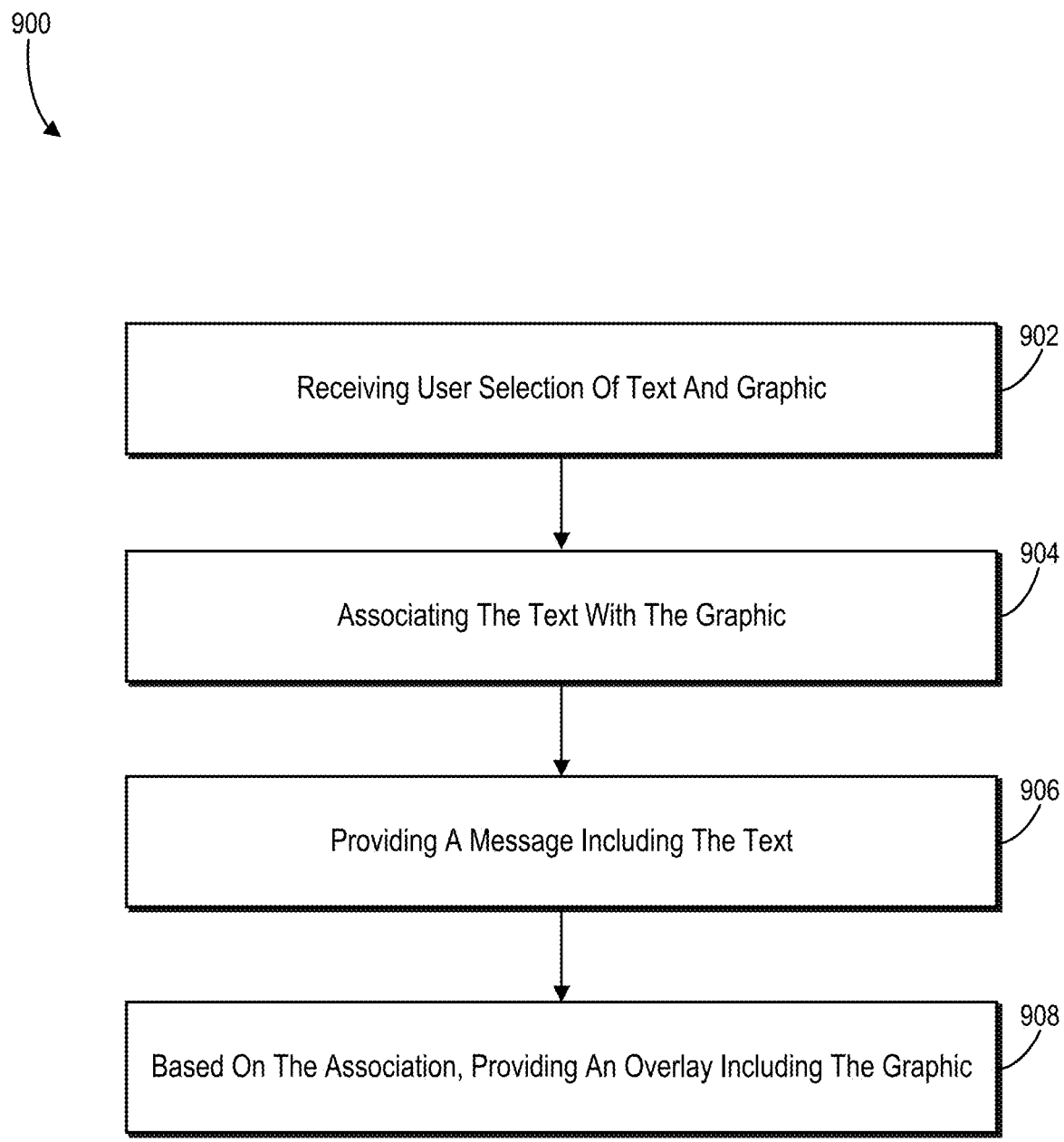
FIG. 9 illustrates a flowchart of a series of acts for associating a graphical element with content and a messaging a messaging thread in accordance with one or more embodiments.

FIGS. 1-8, the corresponding text, and the examples provide a number of different methods, systems, devices, and non-transitory computer-readable media of the messaging system 106. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for providing an overlay to a messaging thread based on an association between a graphic and text in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 for receiving user selection of text and graphic. In particular, the act 902 can include receiving, via a graphical user interface corresponding to a messaging thread, a user selection comprising text and a graphic element. Specifically, the act 902 can include generating a listing of suggested associations between text and graphic elements and receiving a user selection corresponding to the text and the graphic element via the listing of suggested associations.

Additionally, the series of acts 900 includes an act 904 for associating the text with the graphic. In particular, the act 904 can include based on receiving the user selection and generating an association between the text and the graphic element for the messaging thread. Specifically, the act 904 can include receiving an additional user selection of a messaging theme corresponding to one or more additional associations between additional text and additional graphic elements, and based on receiving the additional user selection, applying the one or more additional associations to the messaging thread.

Further, the series of acts 900 includes an act 906 for providing a message including the text. In particular, the act 906 can include detecting a message added to the messaging thread comprising the text. Specifically, the act 906 can include in response to receiving the additional user selection of the messaging theme, make one or more visual or audio changes to the messaging thread.

The series of acts 900 also includes an act 908 for based on the association, providing an overlay including the graphic element. In particular, the act 908 can include in response to detecting the message and based on the association between the text and the graphic element, providing an overlay over the messaging thread including one or more instances of the graphic element. Specifically, the act 908 can include generating the overlay comprising motion of the one or more instances of the graphic element over the messaging thread and providing the overlay by running the motion of the one or more instances of the graphic element for a temporary duration.

Additionally, in one or more embodiments, the act 908 includes generating the overlay comprising an animation of one or more instances of the graphic element over the messaging thread. Act 908 can include providing the overlay by running the animation of the one or more instances of the graphic element. In some embodiments, the act 908 also includes receiving user input comprising updated text associated with the graphic element, detecting an additional message added to the messaging thread comprising the updated text, and in response to detecting the additional message and based on the association between the updated text and the graphic element, providing the overlay over the messaging thread including the one or more instances of the graphic element. Further, in one or more embodiments, the act 908 includes in response to generating the association between the text and the graphic element for the messaging thread, send instructions to one or more client devices associated with the messaging thread for generating the association between the text and the graphic element for the messaging thread.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
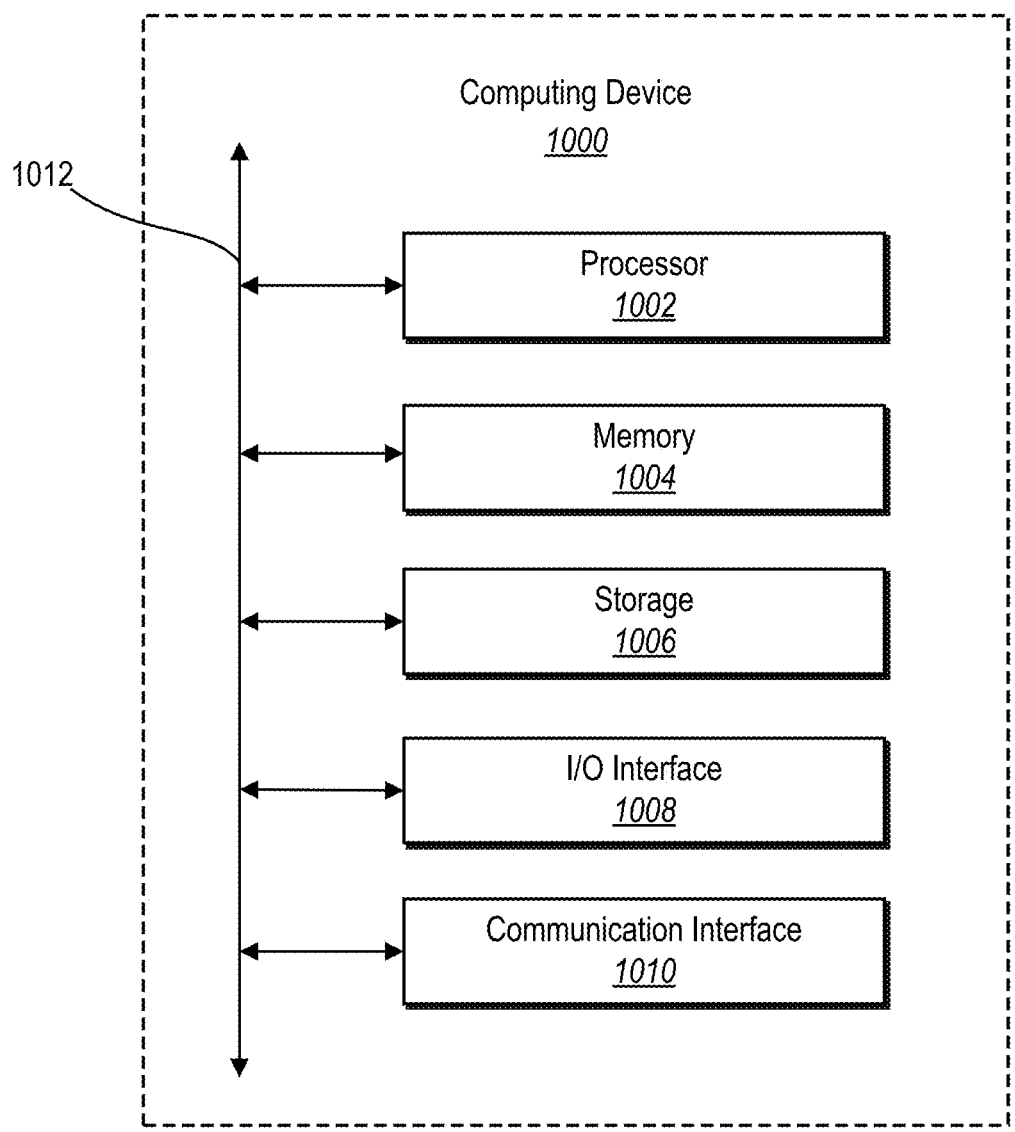
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., server(s) 102 and/or client devices 110a-110n). In one or more embodiments, the computing device 1000 may be a mobile device (e.g., a mobile telephone, a smartphone, a PDA, a tablet, a laptop, a camera, a tracker, a watch, a wearable device, a head mounted display, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In one or more embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other. As an example, the bus 1012 may include one or more types of buses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g., wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 11:
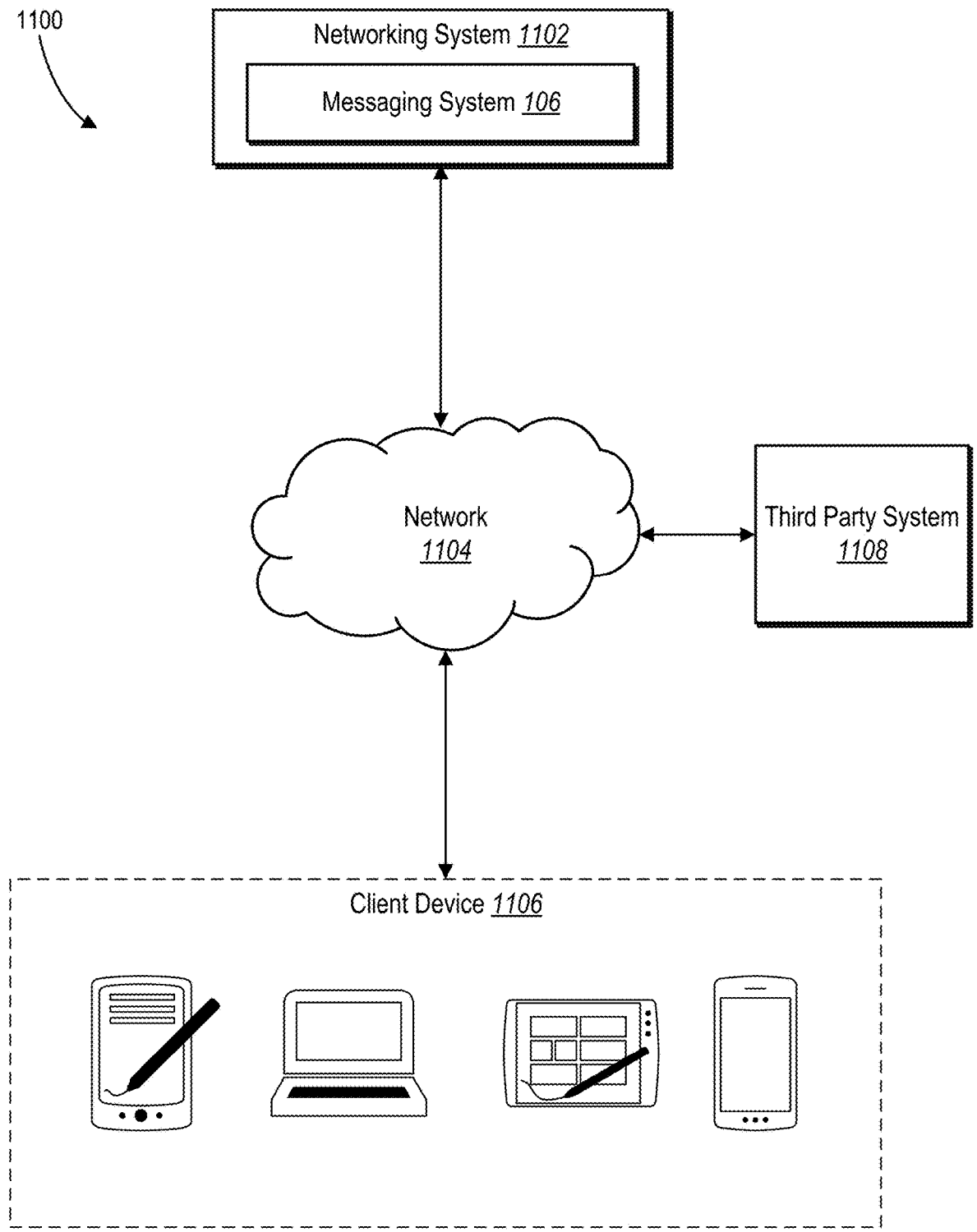
FIG. 11 illustrates a network environment of a social networking system according to one or more embodiments.

FIG. 11 illustrates an example network environment 1100 of a social networking system. Network environment 1100 includes a client device 1106, a networking system 1102 (e.g., a social networking system and/or an electronic messaging system), and a third-party system 1108 connected to each other by a network 1104. Although FIG. 11 illustrates a particular arrangement of client device 1106, networking system 1102, third-party system 1108, and network 1104, this disclosure contemplates any suitable arrangement of client device 1106, networking system 1102, third-party system 1108, and network 1104. As an example, and not by way of limitation, two or more of client device 1106, networking system 1102, and third-party system 1108 may be connected to each other directly, bypassing network 1104. As another example, two or more of client device 1106, networking system 1102, and third-party system 1108 may be physically or logically co-located with each other in whole or in part. Moreover, although FIG. 11 illustrates a particular number of client devices 1106, networking systems 1102, third-party systems 1108, and networks 1104, this disclosure contemplates any suitable number of client devices 1106, networking systems 1102, third-party systems 1108, and networks 1104. As an example, and not by way of limitation, network environment 1100 may include multiple client device 1106, networking systems 1102, third-party systems 1108, and networks 1104.

This disclosure contemplates any suitable network 1104. As an example and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client device 1106, networking system 1102, and third-party system 1108 to communication network 1104 or to each other. This disclosure contemplates any suitable links. In one or more embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In one or more embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In one or more embodiments, client device 1106 may be an electronic device including hardware, software, or embedded logic components or a combination of two or more such components and capable of carrying out the appropriate functionalities implemented or supported by client device 1106. As an example, and not by way of limitation, a client device 1106 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1106. A client device 1106 may enable a network user at client device 1106 to access network 1104. A client device 1106 may enable its user to communicate with other users at other client devices 1106.

In one or more embodiments, client device 1106 may include a web browser, and may have one or more add-ons, plug-ins, or other extensions. A user at client device 1106 may enter a Uniform Resource Locator (URL) or other address directing the web browser to a particular server (such as server, or a server associated with a third-party system 1108), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. Client device 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In one or more embodiments, networking system 1102 may be a network-addressable computing system that can host an online social network. Networking system 1102 may generate, store, receive, and send social-networking data, such as, for example, user-profile data, concept-profile data, social-graph information, or other suitable data related to the online social network. Networking system 1102 may be accessed by the other components of network environment 1100 either directly or via network 1104. In one or more embodiments, networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In one or more embodiments, each server may include hardware, software, or embedded logic components or a combination of two or more such components for carrying out the appropriate functionalities implemented or supported by server. In one or more embodiments, networking system 1102 may include one or more data stores. Data stores may be used to store various types of information. In one or more embodiments, the information stored in data stores may be organized according to specific data structures. In one or more embodiments, each data store may be a relational, columnar, correlation, or other suitable database. Although this disclosure describes or illustrates particular types of databases, this disclosure contemplates any suitable types of databases. One or more embodiments may provide interfaces that enable a client device 1106, a networking system 1102, or a third-party system 1108 to manage, retrieve, modify, add, or delete, the information stored in data store.

In one or more embodiments, networking system 1102 may store one or more social graphs in one or more data stores. In one or more embodiments, a social graph may include multiple nodes—which may include multiple user nodes (each corresponding to a particular user) or multiple concept nodes (each corresponding to a particular concept)—and multiple edges connecting the nodes. Networking system 1102 may provide users of the online social network the ability to communicate and interact with other users. In one or more embodiments, users may join the online social network via networking system 1102 and then add connections (e.g., relationships) to a number of other users of networking system 1102 that they want to be connected to. Herein, the term "friend" may refer to any other user of networking system 1102 with whom a user has formed a connection, association, or relationship via networking system 1102.

In one or more embodiments, networking system 1102 may provide users with the ability to take actions on various types of items or objects, supported by networking system 1102. As an example and not by way of limitation, the items and objects may include groups or social networks to which users of networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1102 or by an external system of third-party system 1108, which is separate from networking system 1102 and coupled to networking system 1102 via a network 1104.

In one or more embodiments, networking system 1102 may be capable of linking a variety of entities. As an example, and not by way of limitation, networking system 1102 may enable users to interact with each other as well as receive content from third-party systems 1108 or other entities, or to allow users to interact with these entities through an application programming interfaces (API) or other communication channels.

In one or more embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from a networking system 1102. In one or more embodiments, however, networking system 1102 and third-party systems 1108 may operate in conjunction with each other to provide social-networking services to users of networking system 1102 or third-party systems 1108. In this sense, networking system 1102 may provide a platform, or backbone, which other systems, such as third-party systems 1108, may use to provide social-networking services and functionality to users across the Internet.

In one or more embodiments, a third-party system 1108 may include a third-party content object provider. A third-party content object provider may include one or more sources of content objects, which may be communicated to a client device 1106. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In one or more embodiments, networking system 1102 also includes user-generated content objects, which may enhance a user's interactions with networking system 1102. User-generated content may include anything a user can add, upload, send, or "post" to networking system 1102. As an example, and not by way of limitation, a user communicates posts to networking system 1102 from a client device 1106. Posts may include data such as status updates or other textual data, location information, photos, videos, links, music or other similar data or media. Content may also be added to networking system 1102 by a third-party through a "communication channel," such as a newsfeed or stream.

In one or more embodiments, networking system 1102 may include a variety of servers, sub-systems, programs, modules, logs, and data stores. In one or more embodiments, networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1102 may also include suitable components such as network interfaces, security mechanisms, load balancers, failover servers, management-and-network-operations consoles, other suitable components, or any suitable combination thereof. In one or more embodiments, networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1102 to one or more client devices 1106 or one or more third-party system 1108 via network 1104. The web server may include a mail server or other messaging functionality for receiving and routing messages between networking system 1102 and one or more client devices 1106. An API-request server may allow a third-party system 1108 to access information from networking system 1102 by calling one or more APIs. An action logger may be used to receive communications from a web server about a user's actions on or off networking system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of networking system 1102. A privacy setting of a user determines how particular information associated with a user can be shared. The authorization server may allow users to opt in to or opt out of having their actions logged by networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client devices 1106 associated with users. Advertisement-pricing modules may combine social information, the current time, location information, or other suitable information to provide relevant advertisements, in the form of notifications, to a user.

Figure 12:
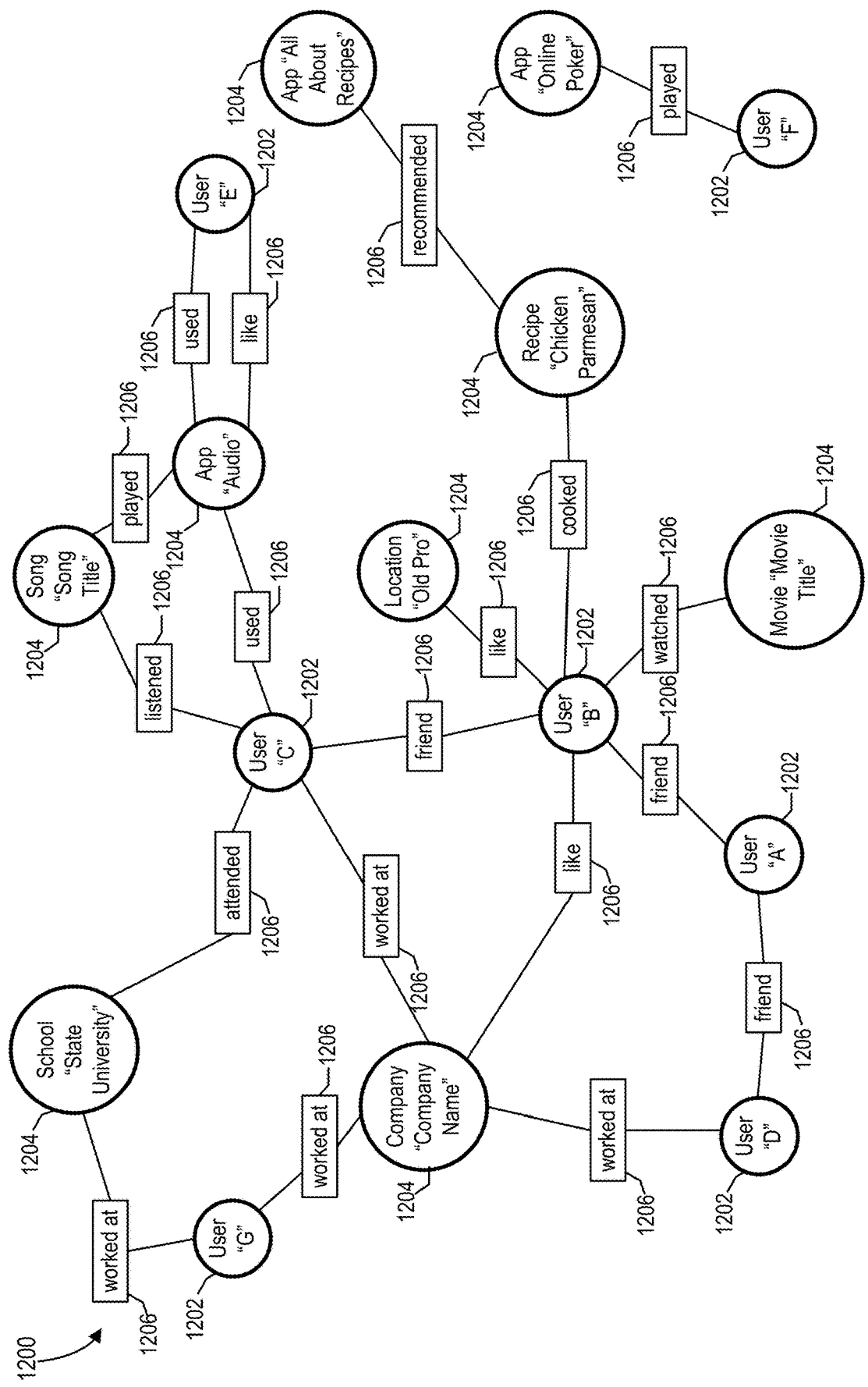
FIG. 12 illustrates an example social graph for a social networking system in accordance with one or more embodiments.

FIG. 12 illustrates example social graph 1200. In one or more embodiments, networking system 1102 may store one or more social graphs 1200 in one or more data stores. In one or more embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In one or more embodiments, a networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In one or more embodiments, a user node 1202 may correspond to a user of networking system 1102. As an example, and not by way of limitation, a user may be an individual (human user), an entity (e.g., an enterprise, business, or third-party application), or a group (e.g., of individuals or entities) that interacts or communicates with or over networking system 1102. In one or more embodiments, when a user registers for an account with networking system 1102, networking system 1102 may create a user node 1202 corresponding to the user, and store the user node 1202 in one or more data stores. Users and user nodes 1202 described herein may, where appropriate, refer to registered users and user nodes 1202 associated with registered users. In addition, or as an alternative, users and user nodes 1202 described herein may, where appropriate, refer to users that have not registered with networking system 1102. In one or more embodiments, a user node 1202 may be associated with information provided by a user or information gathered by various systems, including networking system 1102. As an example, and not by way of limitation, a user may provide his or her name, profile picture, contact information, birth date, sex, marital status, family status, employment, education background, preferences, interests, or other demographic information. In one or more embodiments, a user node 1202 may be associated with one or more data objects corresponding to information associated with a user. In one or more embodiments, a user node 1202 may correspond to one or more webpages.

In one or more embodiments, a concept node 1204 may correspond to a concept. As an example and not by way of limitation, a concept may correspond to a place (such as, for example, a movie theater, restaurant, landmark, or city); a website (such as, for example, a website associated with networking system 1102 or a third-party website associated with a web-application server); an entity (such as, for example, a person, business, group, sports team, or celebrity); a resource (such as, for example, an audio file, video file, digital photo, text file, structured document, or application) which may be located within networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In one or more embodiments, a concept node 1204 may be associated with one or more data objects corresponding to information associated with concept node 1204. In one or more embodiments, a concept node 1204 may correspond to one or more webpages.

In one or more embodiments, a node in social graph 1200 may represent or be represented by a webpage (which may be referred to as a "profile page"). Profile pages may be hosted by or accessible to networking system 1102. Profile pages may also be hosted on third-party websites associated with a third-party system 1108. As an example, and not by way of limitation, a profile page corresponding to a particular external webpage may be the particular external webpage and the profile page may correspond to a particular concept node 1204. Profile pages may be viewable by all or a selected subset of other users. As an example, and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In one or more embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1106 to send to networking system 1102 a message indicating the user's action. In response to the message, networking system 1102 may create an edge (e.g., an "eat" edge) between a user node 1202 corresponding to the user and a concept node 1204 corresponding to the third-party webpage or resource and store edge 1206 in one or more data stores.

In one or more embodiments, a pair of nodes in social graph 1200 may be connected to each other by one or more edges 1206. An edge 1206 connecting a pair of nodes may represent a relationship between the pair of nodes. In one or more embodiments, an edge 1206 may include or represent one or more data objects or attributes corresponding to the relationship between a pair of nodes. As an example, and not by way of limitation, a first user may indicate that a second user is a "friend" of the first user. In response to this indication, networking system 1102 may send a "friend request" to the second user. If the second user confirms the "friend request," networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example, and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In one or more embodiments, an edge 1206 between a user node 1202 and a concept node 1204 may represent a particular action or activity performed by a user associated with user node 1202 toward a concept associated with a concept node 1204. As an example, and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, networking system 1102 may create a "favorite" edge or a "check in" edge in response to a user's action corresponding to a respective action. As another example and not by way of limitation, a user (user "C") may listen to a particular song ("Ramble On") using a particular application (MUSIC, which is an online music application). In this case, networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (MUSIC) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example, and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "MUSIC").

In one or more embodiments, networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept node 1204 by clicking or selecting a "Like" icon, which may cause the user's client device 1106 to send to networking system 1102 a message indicating the user's liking of the concept associated with the concept-profile page. In response to the message, networking system 1102 may create an edge 1206 between user node 1202 associated with the user and concept node 1204, as illustrated by "like" edge 1206 between the user and concept node 1204. In one or more embodiments, networking system 1102 may store an edge 1206 in one or more data stores. In one or more embodiments, an edge 1206 may be automatically formed by networking system 1102 in response to a particular user action. As an example, and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In one or more embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In one or more embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1102 may execute or modify a particular action of the user.

An advertisement may also include social-networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1102) or RSVP (e.g., through networking system 1102) to an event associated with the advertisement. In addition, or as an alternative, an advertisement may include social-networking-system context directed to the user. As an example, and not by way of limitation, an advertisement may display information about a friend of the user within networking system 1102 who has taken an action associated with the subject matter of the advertisement.

In one or more embodiments, networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In one or more embodiments, networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In one or more embodiments, networking system 1102 may use a variety of factors to calculate a coefficient. These factors may include, for example, user actions, types of relationships between objects, location information, other suitable factors, or any combination thereof. In one or more embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In one or more embodiments, the networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In one or more embodiments, networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In one or more embodiments, networking system 1102 may calculate a coefficient based on a user's actions. Networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In one or more embodiments, networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Networking system 1102 may analyze a user's actions to determine whether one or more of the actions indicate an affinity for subject matter, content, other users, and so forth. As an example, and not by way of limitation, if a user may make frequently posts content related to "coffee" or variants thereof, networking system 1102 may determine the user has a high coefficient with respect to the concept "coffee." Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In one or more embodiments, networking system 1102 may calculate a coefficient based on the type of relationship between particular objects. Referencing the social graph 1200, networking system 1102 may analyze the number and/or type of edges 1206 connecting particular user nodes 1202 and concept nodes 1204 when calculating a coefficient. As an example, and not by way of limitation, user nodes 1202 that are connected by a spouse-type edge (representing that the two users are married) may be assigned a higher coefficient than a user node 1202 that are connected by a friend-type edge. In other words, depending upon the weights assigned to the actions and relationships for the particular user, the overall affinity may be determined to be higher for content about the user's spouse than for content about the user's friend. In one or more embodiments, the relationships a user has with another object may affect the weights and/or the ratings of the user's actions with respect to calculating the coefficient for that object. As an example, and not by way of limitation, if a user is tagged in first photo, but merely likes a second photo, networking system 1102 may determine that the user has a higher coefficient with respect to the first photo than the second photo because having a tagged-in-type relationship with content may be assigned a higher weight and/or rating than having a like-type relationship with content. In one or more embodiments, networking system 1102 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, networking system 1102 may determine that the first user should also have a relatively high coefficient for the particular object. In one or more embodiments, the coefficient may be based on the degree of separation between particular objects. The lower coefficient may represent the decreasing likelihood that the first user will share an interest in content objects of the user that is indirectly connected to the first user in the social graph 1200. As an example, and not by way of limitation, social-graph entities that are closer in the social graph 1200 (i.e., fewer degrees of separation) may have a higher coefficient than entities that are further apart in the social graph 1200.

In one or more embodiments, networking system 1102 may calculate a coefficient based on location information. Objects that are geographically closer to each other may be considered to be more related, or of more interest, to each other than more distant objects. In one or more embodiments, the coefficient of a user towards a particular object may be based on the proximity of the object's location to a current location associated with the user (or the location of a client device 1106 of the user). A first user may be more interested in other users or concepts that are closer to the first user. As an example, and not by way of limitation, if a user is one mile from an airport and two miles from a gas station, networking system 1102 may determine that the user has a higher coefficient for the airport than the gas station based on the proximity of the airport to the user.

In one or more embodiments, networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1102 may provide information that is relevant to user's interests and current circumstances, increasing the likelihood that they will find such information of interest. In one or more embodiments, networking system 1102 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In one or more embodiments, networking system 1102 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In one or more embodiments, networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, networking system 1102 may calculate the coefficient (or access the coefficient information if it has previously been calculated and stored). In one or more embodiments, networking system 1102 may measure an affinity with respect to a particular process. Different processes (both internal and external to the online social network) may request a coefficient for a particular object or set of objects. Networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, one or more embodiments may utilize one or more systems, components, elements, functions, methods, operations, or steps disclosed in U.S. patent application Ser. No. 11/503,093, filed 11 Aug. 2006, U.S. patent application Ser. No. 12/971,1027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In one or more embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In one or more embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In one or more embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 1204 corresponding to a particular photo may have a privacy setting specifying that the photo may only be accessed by users tagged in the photo and their friends. In one or more embodiments, privacy settings may allow users to opt in or opt out of having their actions logged by networking system 1102 or shared with other systems (e.g., third-party system 1108). In one or more embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In one or more embodiments, one or more servers may be authorization/privacy servers for enforcing privacy settings. In response to a request from a user (or other entity) for a particular object stored in a data store, networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor of a first client device, cause the at least one processor to:
   receive, via a graphical user interface corresponding to a messaging thread on the first client device, a user input of a text for creating a customized graphical effect for the text in messages exchanged among client devices associated with the messaging thread;
   in response to the user input of the text, display, on the graphical user interface, selectable graphic elements corresponding to the text;
   detect, via the graphical user interface displaying the selectable graphic elements, a user selection of a graphic element to be associated with the text;
   based on the user input of the text and the user selection of the graphic element, generate an association between the text and the graphic element for the messaging thread;
   based on the association, generate a rule for the client devices associated with the messaging thread to provide the graphic element in an overlay over the messaging thread in response to detecting the text in the messaging thread;
   send the rule and the association between the text and the graphic element for the messaging thread from the first client device to other client devices associated with the messaging thread for the other client devices to store the rule and the association for the messaging thread;
   detect the text being entered in a new message added to the messaging thread on the first client device, and that the text in the new message maps to the association between the text and the graphic element; and
   in response to detecting that the text in the new message maps to the association between the text and the graphic element, send, from the first client device to the other client devices, the new message comprising the text and metadata indicating the association between the text and the graphic element,
   wherein the other client devices are to display the new message comprising the text and, based on the metadata, implement the rule by retrieving the graphic element from the association stored on the other client devices and providing the graphic element in an overlay over the new message displayed on the other devices.

2. The non-transitory computer-readable medium of claim 1, further comprising instructions that, when executed by the at least one processor, cause the at least one processor to:

generate the overlay comprising motion of the graphic element over the new message in the messaging thread; and provide the overlay by running the motion of the graphic element for a temporary duration.

3. The non-transitory computer-readable medium of claim 1, further comprising instructions that, when executed by the at least one processor, cause the at least one processor to:

generate the overlay comprising an animation of the graphic element over the new message in the messaging thread; and provide the overlay by running the animation of the graphic element.

4. The non-transitory computer-readable medium of claim 1, further comprising instructions that, when executed by the at least one processor, cause the at least one processor to:

receive an additional user selection of a messaging theme corresponding to one or more additional associations between additional texts and additional graphic elements; and based on receiving the additional user selection, apply the one or more additional associations between the additional texts and the additional graphic elements to the messaging thread.

5. The non-transitory computer-readable medium of claim 4, further comprising instructions that, when executed by the at least one processor, cause the at least one processor to, in response to receiving the additional user selection of the messaging theme, make one or more visual changes to the messaging thread with the additional graphic elements.

6. The non-transitory computer-readable medium of claim 1, further comprising instructions that, when executed by the at least one processor, cause the at least one processor to:

store the rule and the association between the text and the graphic element for the messaging thread in a matching table on the first client device.

7. The non-transitory computer-readable medium of claim 1, further comprising instructions that, when executed by the at least one processor, cause the at least one processor to:

receive user input comprising an updated text associated with the graphic element;

detect the updated text being entered in an additional message added to the messaging thread; and in response to detecting the updated text in the additional message and based on the association between the updated text and the graphic element, provide the graphic element in the overlay over the additional message in the messaging thread.

8. A system comprising:

a memory device storing instructions; and at least one processor configured to execute the instructions to cause the system on a first client device to:

receive, via a graphical user interface corresponding to a messaging thread on the first client device, a user input of a text for creating a customized graphical effect for the text in messages exchanged among client devices associated with the messaging thread;

in response to the user input of the text, display, on the graphical user interface, selectable graphic elements corresponding to the text;

detect, via the graphical user interface displaying the selectable graphic elements, a user selection of a graphic element to be associated with the text;

based on the user input of the text and the user selection of the graphic element, generate an association between the text and the graphic element for the messaging thread;

based on the association, generate a rule for the client devices associated with the messaging thread to provide the graphic element in an overlay over the messaging thread in response to detecting the text in the messaging thread;

send the rule and the association between the text and the graphic element for the messaging thread from the first client device to other client devices associated with the messaging thread for the other client devices to store the rule and the association for the messaging thread;

detect the text being entered in a new message added to the messaging thread on the first client device, and that the text in the new message maps to the association between the text and the graphic element; and in response to detecting that the text in the new message maps to the association between the text and the graphic element, send, from the first client device to the other client devices, the new message comprising the text and metadata indicating the association between the text and the graphic element, wherein the other client devices are to display the new message comprising the text and implement the rule based on the metadata by retrieving the graphic element from the association stored on the other client devices and providing the graphic element in an overlay over the new message displayed on the other devices.

9. The system of claim 8, wherein that at least one processor is further configured to execute the instructions to cause the system to:

generate the overlay comprising motion of the graphic element over the new message in the messaging thread; and provide the overlay by running the motion of the graphic element for a temporary duration.

10. The system of claim 8, wherein that at least one processor is further configured to execute the instructions to cause the system to:

generate the overlay comprising an animation of the graphic element over the new message in the messaging thread; and provide the overlay by running the animation of the graphic element.

11. The system of claim 8, wherein that at least one processor is further configured to execute the instructions to cause the system to:

receive an additional user selection of a messaging theme corresponding to one or more additional associations between additional texts and additional graphic elements; and based on receiving the additional user selection, apply the one or more additional associations between additional texts and additional graphic elements to the messaging thread.

12. The system of claim 11, wherein that at least one processor is further configured to execute the instructions to cause the system to, in response to receiving the additional user selection of the messaging theme, make one or more visual changes to the messaging thread with the additional graphic elements.

13. The system of claim 8, wherein that at least one processor is further configured to execute the instructions to cause the system to:

store the rule and the association between the text and the graphic element for the messaging thread in a matching table on the first client device.

14. The system of claim 8, wherein that at least one processor is further configured to execute the instructions to cause the system to:
- receive user input comprising an updated text associated with the graphic element;
- detect the updated text being entered in an additional message added to the messaging thread comprising the updated text; and
- in response to detecting the updated text in the additional message, retrieve the graphic element based on the association between the updated text and the graphic element, and provide the graphic element in the overlay over in the additional message in the messaging thread.

15. A computer-implemented method comprising:
- receiving, via a graphical user interface corresponding to a messaging thread on the first client device, a user input of a text for creating a customized graphical effect for the text in messages exchanged among client devices associated with the messaging thread;
- in response to the user input of the text, displaying, on the graphical user interface, selectable graphic elements corresponding to the text;
- detecting, via the graphical user interface displaying the selectable graphic elements, a user selection of a graphic element to be associated with the text;
- based on the user input of the text and the user selection of the graphic element, generating an association between the text and the graphic element for the messaging thread;
- based on the association, generating a rule for the client devices associated with the messaging thread to provide the graphic element in an overlay over the messaging thread in response to detecting the text in the messaging thread;
- sending the rule and the association between the text and the graphic element for the messaging thread from the first client device to other client devices associated with the messaging thread for the other client devices to store the rule and the association for the messaging thread;
- detecting the text being entered in a new message added to the messaging thread and that the text in the new message maps to the association between the text and the graphic element; and
- in response to detecting that the text in the new message maps to the association between the text and the graphic element, sending, from the first client device to the other client devices, the new message comprising the text and metadata indicating the association between the text and the graphic element,
- wherein the other client devices are to display the new message comprising the text and, based on the metadata, implement the rule by retrieving the graphic element from the association stored on the other client devices and providing the graphic element in an overlay over the new message displayed on the other devices.

16. The computer-implemented method of claim 15, further comprising:
- generating the overlay comprising motion of the graphic element over the new message in the messaging thread; and
- providing the overlay by running the motion of the graphic element for a temporary duration.

17. The computer-implemented method of claim 15, further comprising:
- receiving an additional user selection of a messaging theme corresponding to one or more additional associations between additional texts and additional graphic elements;
- based on receiving the additional user selection, applying the one or more additional associations between additional texts and additional graphic elements to the messaging thread; and
- in response to receiving the additional user selection of the messaging theme, making one or more visual changes to the messaging thread with the additional graphic elements.

18. The computer-implemented method of claim 15, further comprising:
- storing the rule and the association between the text and the graphic element for the messaging thread in a matching table on the first client device.

* * * * *